US012592850B2

(12) United States Patent
Horn et al.

(10) Patent No.: US 12,592,850 B2
(45) Date of Patent: Mar. 31, 2026

(54) EQUALIZATION DOMAIN SELECTION AT A WIRELESS DEVICE

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 17/894,025

(22) Filed: Aug. 23, 2022

(65) Prior Publication Data

US 2024/0073067 A1 Feb. 29, 2024

(51) Int. Cl.
| | |
|---|---|
| *H04L 12/66* | (2006.01) |
| *H04L 27/01* | (2006.01) |
| *H04L 27/26* | (2006.01) |

(52) U.S. Cl.
CPC .......... *H04L 27/01* (2013.01); *H04L 27/2636* (2013.01)

(58) Field of Classification Search
CPC ........... H04L 25/03159; H04L 27/2636; H04L 27/2602; H04L 27/26526; H04L 5/0007;
(Continued)

(56) References Cited

U.S. PATENT DOCUMENTS 9,231,792 B1 1/2016 Torrini et al.
10,305,636 B1 * 5/2019 Shattil ................... H04L 1/0681
(Continued)

FOREIGN PATENT DOCUMENTS

EP 2557744 A1 2/2013

OTHER PUBLICATIONS

Harris F., et al., "Performance and Design Considerations of the Farrow Filter When Used for Arbitrary Resampling of Sampled Time Series", Signals, Systems & Computers, 1997, Conference Record of the Thirty-FI RST Asilomar Conference on Pacific Grove, Ca, USA Nov. 2-5, 1997, Los Alamitos, Ca, USA, IEEE Comput. Soc, US, Nov. 2, 1997, p. 1745, XP032140470, pp. 1745-1749, Abstract.

(Continued)

*Primary Examiner* — Kharye Pope
(74) *Attorney, Agent, or Firm* — Holland & Hart LLP

(57) ABSTRACT

This disclosure provides systems, methods and apparatus, including computer programs encoded on computer storage media, for equalization domain selection at a wireless device. A wireless device may be configured to support a selection between time domain equalization and frequency domain equalization for receiving RF signals, which may be performed in accordance with detected channel conditions. For example, if a wireless device detects conditions associated with a relatively dispersive channel, the wireless device may select a frequency domain equalization and, if the wireless device detects conditions associated with a relatively flat channel, the wireless device may select a time domain equalization. In some implementations, performing a time domain equalization may include changing a sampling rate into a symbol rate, such as performing a resampling using a Farrow resampler. Such techniques may include a wireless device selecting an equalization scheme associated with a relatively lowest power consumption for detected channel conditions.

27 Claims, 6 Drawing Sheets

(58) Field of Classification Search
CPC .............. H04L 27/2601; H04L 5/0023; H04L 2025/03414; H04L 27/2662; H04L 5/0048; H04B 7/0452; H04B 1/0475
See application file for complete search history.

(56) References Cited

U.S. PATENT DOCUMENTS

| | | | | |
|---|---|---|---|---|
| 2004/0048584 | A1* | 3/2004 | Vaidyanathan | .......... H04B 7/04 455/101 |
| 2008/0084817 | A1* | 4/2008 | Beckman | .............. H04L 25/025 370/210 |
| 2009/0304132 | A1* | 12/2009 | Cairns | .................. H04B 1/7117 375/347 |
| 2010/0272196 | A1* | 10/2010 | Mansour | ............. H04L 27/2695 375/340 |
| 2012/0314750 | A1* | 12/2012 | Mehrabani | ........ H04L 25/03159 375/229 |
| 2013/0016761 | A1* | 1/2013 | Nentwig | ................ H04B 15/06 375/219 |
| 2014/0269883 | A1* | 9/2014 | Thompson | .......... H04L 25/0216 375/232 |
| 2015/0110207 | A1* | 4/2015 | Murrin | .................. H04L 5/0048 375/346 |
| 2015/0270993 | A1* | 9/2015 | Cheung | ............. H04L 25/03159 375/232 |
| 2019/0132821 | A1* | 5/2019 | Goto | ...................... H04W 74/02 |
| 2021/0243065 | A1* | 8/2021 | Ferdinand | ........... H04L 27/2653 |
| 2022/0077954 | A1* | 3/2022 | Xin | ...................... H04L 27/2646 |
| 2023/0261906 | A1* | 8/2023 | Kim | ...................... H04L 25/022 370/252 |
| 2024/0154739 | A1* | 5/2024 | Lopez | .................. H04L 5/0048 |

OTHER PUBLICATIONS

International Search Report and Written Opinion—PCT/US2023/072215—ISA/EPO—Nov. 9, 2023.

* cited by examiner

130

105

115

Network
Entity

Transceiver

510

Antenna

515

Communications
Manager

520

Memory

Code

530

525

540

Processor

535

505

500

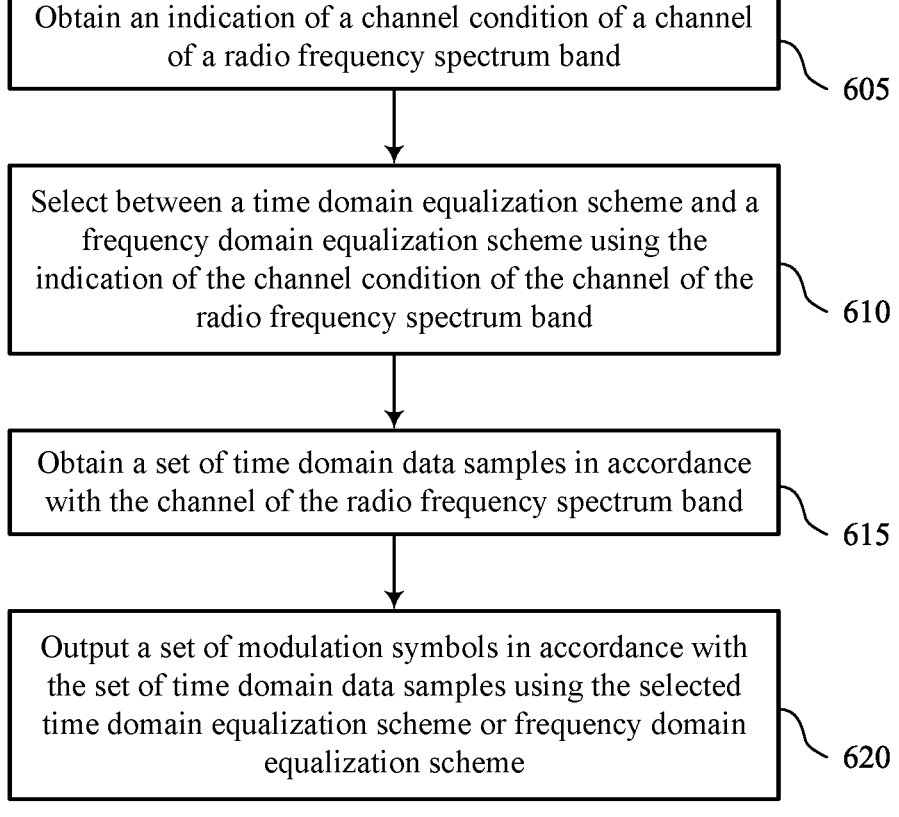

Obtain an indication of a channel condition of a channel of a radio frequency spectrum band

605

Select between a time domain equalization scheme and a frequency domain equalization scheme using the indication of the channel condition of the channel of the radio frequency spectrum band

610

Obtain a set of time domain data samples in accordance with the channel of the radio frequency spectrum band

615

Output a set of modulation symbols in accordance with the set of time domain data samples using the selected time domain equalization scheme or frequency domain equalization scheme

EQUALIZATION DOMAIN SELECTION AT A WIRELESS DEVICE

TECHNICAL FIELD

This disclosure relates to wireless communications, including equalization domain selection at a wireless device.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for a wireless communications. The method may include obtaining an indication of a channel condition of a channel of a radio frequency spectrum band, selecting between a time domain equalization scheme and a frequency domain equalization scheme using the indication of the channel condition of the channel of the radio frequency spectrum band, obtaining a set of time domain data samples in accordance with the channel of the radio frequency spectrum band, and outputting a set of modulation symbols in accordance with the set of time domain data samples using the selected time domain equalization scheme or frequency domain equalization scheme.

Another innovative aspect of the subject matter described in this disclosure can be implemented in an apparatus for wireless communications. The apparatus may include one or more interfaces and a processing system. The one or more interfaces may be configured to obtain an indication of a channel condition of a channel of a radio frequency spectrum band. The processing system may be configured to select between a time domain equalization scheme and a frequency domain equalization scheme using the indication of the channel condition of the channel of the radio frequency spectrum band. The one or more interfaces may be configured to obtain a set of time domain data samples in accordance with the channel of the radio frequency spectrum band, and output a set of modulation symbols in accordance with the set of time domain data samples using the selected time domain equalization scheme or frequency domain equalization scheme.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to obtain an indication of a channel condition of a channel of a radio frequency spectrum band, select between a time domain equalization scheme and a frequency domain equalization scheme using the indication of the channel condition of the channel of the radio frequency spectrum band, obtain a set of time domain data samples in accordance with the channel of the radio frequency spectrum band, and output a set of modulation symbols in accordance with the set of time domain data samples using the selected time domain equalization scheme or frequency domain equalization scheme.

Another innovative aspect of the subject matter described in this disclosure can be implemented in an apparatus for wireless communications. The apparatus may include means for obtaining an indication of a channel condition of a channel of a radio frequency spectrum band, means for selecting between a time domain equalization scheme and a frequency domain equalization scheme using the indication of the channel condition of the channel of the radio frequency spectrum band, means for obtaining a set of time domain data samples in accordance with the channel of the radio frequency spectrum band, and means for outputting a set of modulation symbols in accordance with the set of time domain data samples using the selected time domain equalization scheme or frequency domain equalization scheme.

Another innovative aspect of the subject matter described in this disclosure can be implemented in a non-transitory computer-readable medium storing code for wireless communications. The code may include instructions executable by a processor to obtain an indication of a channel condition of a channel of a radio frequency spectrum band, select between a time domain equalization scheme and a frequency domain equalization scheme using the indication of the channel condition of the channel of the radio frequency spectrum band, obtain a set of time domain data samples in accordance with the channel of the radio frequency spectrum band, and output a set of modulation symbols in accordance with the set of time domain data samples using the selected time domain equalization scheme or frequency domain equalization scheme.

Some implementations of the method, apparatuses, and non-transitory computer-readable medium described herein may include operations, features, means, or instructions for resampling the set of time domain data samples in accordance with an orthogonal frequency-division multiplexing (OFDM) symbol rate to obtain a resampled set of time domain data samples in response to selecting the time domain equalization scheme, and performing the time domain equalization scheme using the resampled set of time domain data samples to obtain an equalized set of time domain data samples.

Some implementations of the method, apparatuses, and non-transitory computer-readable medium described herein may include operations, features, means, or instructions for performing the time domain equalization scheme using the set of time domain data samples to obtain an equalized set of time domain data samples in response to selecting the time domain equalization scheme.

Some implementations of the method, apparatuses, and non-transitory computer-readable medium described herein may include operations, features, means, or instructions for performing a Fourier transform on the set of time domain data samples to obtain a set of frequency domain data samples in response to selecting the frequency domain equalization scheme, and performing the frequency domain equalization scheme using the set of frequency domain data samples to obtain an equalized set of frequency domain data samples.

Some examples of the method, apparatuses, and non-transitory computer-readable medium described herein may include operations, features, means, or instructions for selecting between the time domain equalization scheme and the frequency domain equalization scheme in accordance with a power associated with the time domain equalization scheme corresponding to the channel condition and a power associated with the frequency domain equalization scheme corresponding to the channel condition.

Some examples of the method, apparatuses, and non-transitory computer-readable medium described herein may include operations, features, means, or instructions for selecting between the time domain equalization scheme and the frequency domain equalization scheme in accordance with a delay spread associated with the channel condition.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6 shows a flowchart illustrating methods that support equalization domain selection at a wireless device.

Like reference numbers and designations in the various drawings indicate like elements.

DETAILED DESCRIPTION

Figure 1:
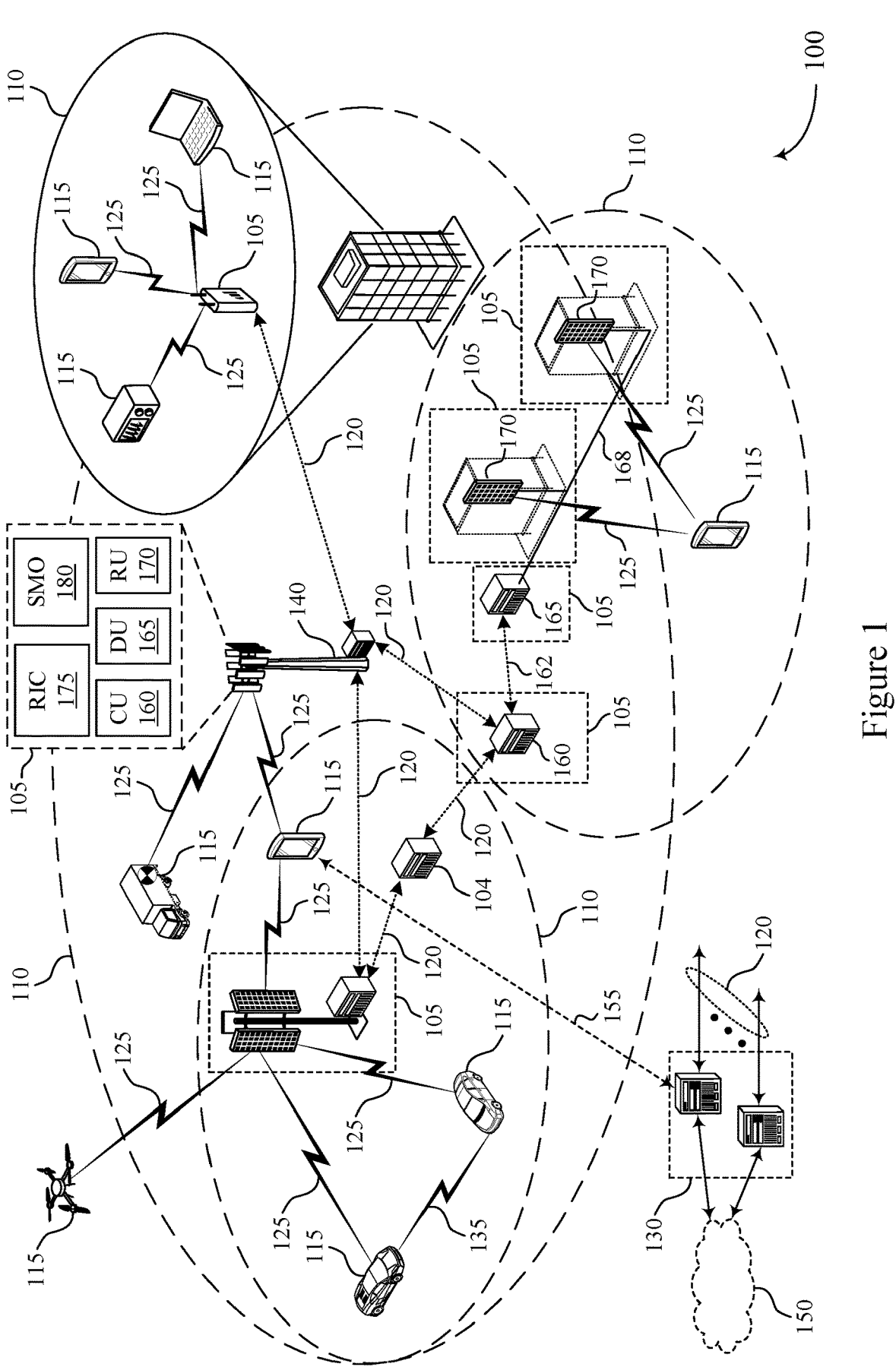
FIG. 1 shows an example of a wireless communications system that supports equalization domain selection at a wireless device.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G), fifth generation (5G), or sixth generation (6G), or further implementations thereof, technology.

Wireless communications between wireless devices may involve various sources of power consumption, including signal processing at a transmitting device, RF signal transmission at the transmitting device, RF signal reception at a receiving device, and signal processing at the receiving device. In some implementations, power consumption at a mobile wireless device, such as a user equipment (UE), may be relevant to tradeoffs that involve a limited power supply, such as power supplied from a battery of the mobile wireless device. Challenges related to power consumption at a wireless device may be relatively prominent with a growth in bandwidth (including frequency ranges such as FR4 or FR5, or frequency ranges associated with 6G), because supporting higher bandwidth signals and higher data rates may be associated with increased power consumption.

In relatively high frequency ranges, such as frequency ranges associated with sub-terahertz (THz) bands, antenna dimensions may be relatively small, which may support implementing a higher quantity of antenna elements in an antenna array (such as for a given array size). In some implementations, increasing a quantity of antenna elements may support relatively higher antenna gain, or narrower beams, among other signaling characteristics. A combination of relatively smaller beam width and relatively higher path loss (such as path loss in accordance with the Friis formula) may decrease a degree of beam scattering (such as dispersion), which may support an RF channel having a nearly flat frequency domain response. Such characteristics may support utilizing relatively power-efficient waveforms, such as single carrier (SC) waveforms, discrete Fourier transform spread orthogonal frequency division multiplexing (DFT-s-OFDM) waveforms, or CDMA waveforms, among other such waveforms, which may be more attractive than orthogonal frequency division multiplexed (OFDM) waveforms in some scenarios (such as scenarios in which a channel has a relatively flat frequency response, for which some techniques for OFDM waveforms may be associated with relatively high complexity, relatively high processing load, relatively high power consumption, or both).

To leverage such signaling characteristics, SC and DFT-s-OFDM waveforms may be suitable for implementation in relatively high frequency bands, such as frequencies associated with an FR2x band and higher frequencies. In some implementations, processing of DFT-s-OFDM waveforms at a receiving device may involve equalization in the frequency domain, and processing of SC waveforms at a receiving device may involve equalization in the time domain. For relatively dispersive channel conditions, including channels associated with a relatively high delay spread, frequency domain equalization of DFT-s-OFDM waveforms may support relatively higher performance and efficiency than time domain equalization of SC waveforms. However, for relatively flat channel conditions, including channels associated with a relatively low delay spread, time domain equalization of SC waveforms may support performance similar to the frequency domain equalization of DFT-s-OFDM waveforms, but with lower complexity and lower power consumption.

In some implementations, a wireless device may be configured to support a selection between time domain equalization and frequency domain equalization for receiving RF signals, which may be performed in accordance with detected channel conditions (such as channel conditions detected by or otherwise indicated to the wireless device). For example, if a wireless device detects conditions associated with a relatively dispersive channel (such as for a channel associated with relatively high delay spread), the wireless device may select a frequency domain equalization to support relatively high signaling performance, which may involve performing Fourier transform operations such as Discrete Fourier Transform (DFT) operations, Fast Fourier Transform (FFT) operations, Inverse Discrete Fourier Transform (IDFT) operations, or Inverse Fourier Transform (IFFT) operations, or various combinations thereof. In some implementations, performing a frequency domain equalization for a relatively dispersive channel may be associated with lower power consumption than a time domain equalization for the relatively dispersive channel. If the wireless device detects conditions associated with a relatively flat channel (such as for a channel associated with relatively high delay spread), the wireless device may select a time domain equalization to support relatively lower processing complexity, with signaling performance that may be the same as or similar to similar to a frequency domain equalization. In some implementations, performing the time domain equalization may include changing a sampling rate into a symbol rate (such as a resampling using a Farrow resampler), which may be performed without involving one or more Fourier transform operations that each may be associated with relatively high computational cost. Thus, in some circumstances, performing a time domain equalization for a relatively flat channel may involve lower power consumption than a frequency domain equalization for the relatively flat channel.

Particular implementations of the subject matter described in this disclosure can be implemented to realize one or more of the following potential advantages. For example, by supporting a selection between equalization techniques based on detected channel conditions, a wireless device may be able to select an equalization technique that is associated with lower power consumption for channel conditions that are relevant to the wireless device. Moreover, by implementing such techniques, some waveforms, such as DFT-s-OFDM waveforms, may support signaling that is relatively power-efficient at a receiving device for both dispersive and flat channels, such as in comparison to OFDM and SC waveforms. Accordingly, such techniques may address certain power consumption drawbacks associated with DFT-s-OFDM signaling, while maintaining other favorable characteristics of DFT-s-OFDM signaling. Such characteristics may be relevant to mobile wireless devices (such as UEs), including wireless devices that receive signaling over downlink or sidelink channels (such as signaling from a network entity or another UE), for improving efficiency or extending a duration of operation while using a limited power supply, such as a battery.

FIG. 1 shows an example of a wireless communications system 100 that supports equalization domain selection at a wireless device. The wireless communications system 100 may include one or more network entities 105, one or more UEs 115, and a core network 130. In some implementations, the wireless communications system 100 may be an LTE network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, a wireless device, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or another interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support equalization domain selection at a wireless device as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

The communication links 125 shown in the wireless communications system 100 may include downlink transmissions (such as forward link transmissions) from a network entity 105 to a UE 115, uplink transmissions (such as return link transmissions) from a UE 115 to a network entity 105, or both, among other configurations of transmissions. Carriers may carry downlink or uplink communications (such as in an FDD mode) or may be configured to carry downlink and uplink communications (such as in a TDD mode).

Signal waveforms transmitted via a carrier may be made up of multiple subcarriers (such as using multi-carrier modulation (MCM) techniques such as OFDM or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s=1/(\Delta f_{max} \cdot N_f)$ seconds, for which $\Delta f_{max}$ may represent a supported subcarrier spacing, and $N_f$ may represent a supported DFT size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

The wireless communications system 100 may be configured to utilize relatively power-efficient waveforms, such as SC waveforms, DFT-s-OFDM waveforms, or CDMA waveforms, among others. In some implementations, processing of DFT-s-OFDM waveforms at a receiving device may involve equalization in the frequency domain and processing of SC waveforms at a receiving device may involve equalization in the time domain. For relatively dispersive channel conditions, including channels associated with a relatively high delay spread, frequency domain equalization of DFT-s-OFDM waveforms may support relatively higher performance and efficiency than time domain equalization of SC waveforms. However, for relatively flat channel conditions, including channels associated with a relatively low delay spread, time domain equalization of SC waveforms may support performance similar to the frequency domain equalization of DFT-s-OFDM waveforms, but with lower complexity and lower power consumption.

In accordance with examples as disclosed herein, a wireless device of the wireless communications system 100, such as a UE 115 or a network entity 105, may be configured to support a selection between time domain equalization and frequency domain equalization for receiving RF signals, which may support a selection of an equalization technique that is associated with a relatively lower processing complexity or a relatively lower power consumption for given channel conditions. For example, if a wireless device detects conditions associated with a relatively dispersive channel (such as for a channel associated with relatively high delay spread), the wireless device may select a frequency domain equalization to support relatively high signaling performance, which may involve performing Fourier transform operations such as DFT operations, FFT operations, IDFT operations, or IFFT operations, or various combinations thereof. In some circumstances, performing a frequency domain equalization for a relatively dispersive channel may be associated with lower power consumption than a time domain equalization for the relatively dispersive channel. If the wireless device detects conditions associated with a relatively flat channel (such as for a channel associated with relatively high delay spread), the wireless device may select a time domain equalization to support relatively lower processing complexity, with signaling performance that may be the same as or similar to similar to a frequency domain equalization. In some implementations, performing the time domain equalization may include changing a sampling rate into a symbol rate (such as a resampling using a Farrow resampler), which may be performed without performing one or more Fourier transform operations that each may be associated with relatively high computational cost. Thus, in some circumstances, performing a time domain equalization for a relatively flat channel may involve lower power consumption than a frequency domain equalization for the relatively flat channel.

Figure 2:
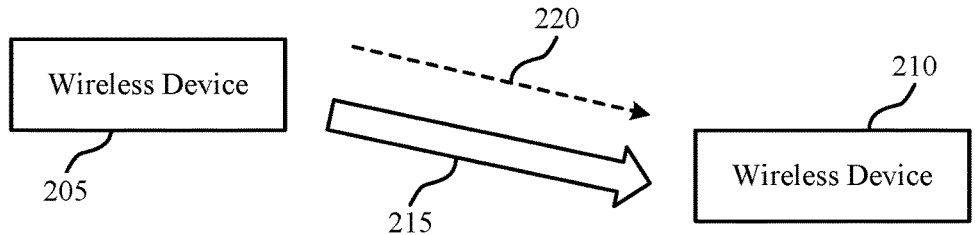
FIG. 2 shows an example of a signaling diagram that supports equalization domain selection at a wireless device.
Figure 2:
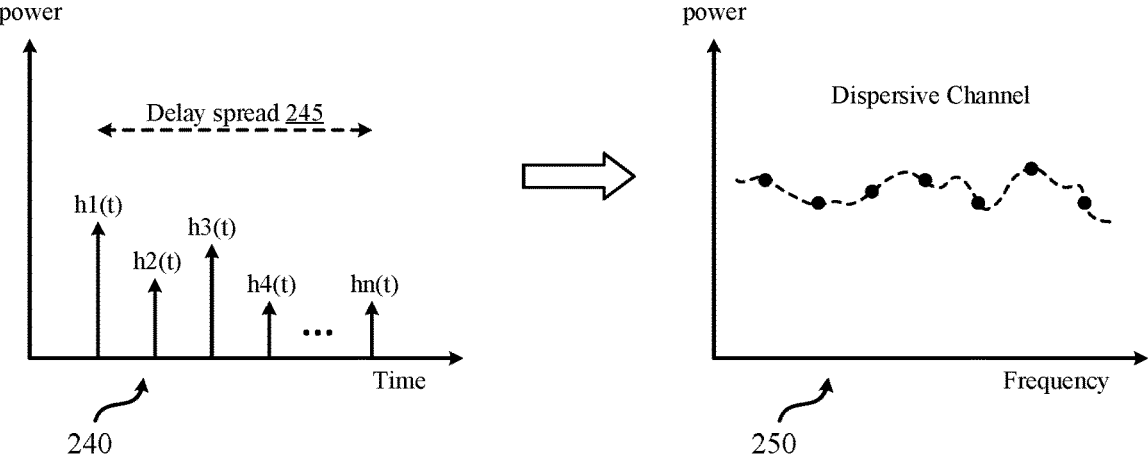
Figure 2:
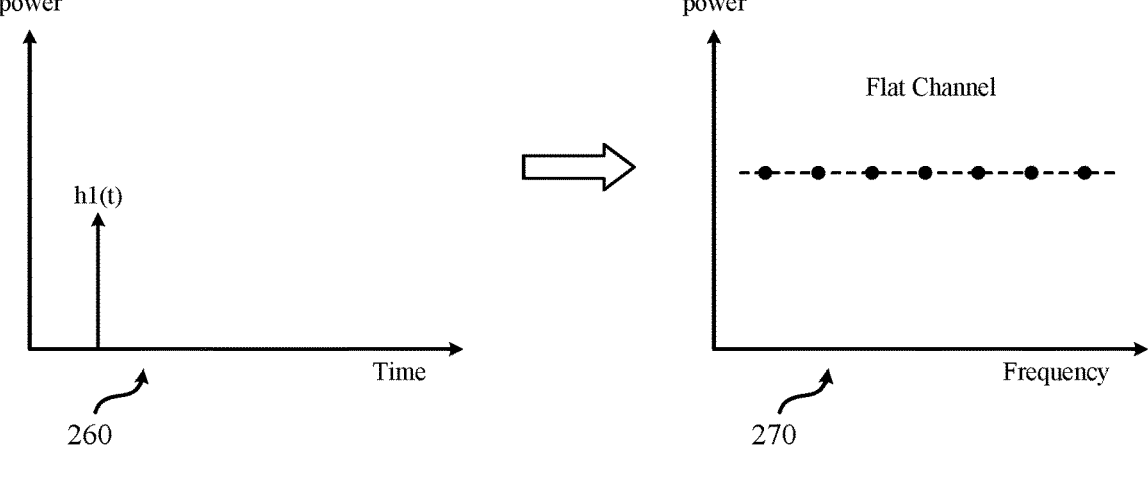

FIG. 2 shows an example of a signaling diagram 200 that supports equalization domain selection at a wireless device. The signaling diagram 200 includes a wireless device 205, a device performing a transmission, and a wireless device 210, a device performing a reception. Aspects of the signaling diagram 200 may be described with reference to a transmission 215 that is transmitted by the wireless device 205.

The signaling diagram 200 may be associated with various types of wireless devices and various types of signaling. For an implementation in which the wireless device 205 is a network entity 105 and the wireless device 210 is a UE 115, the transmission 215 may be performed in accordance with a downlink channel. For an implementation in which the wireless device 205 is a UE 115 and the wireless device 210 is a UE 115, the transmission 215 may be performed in accordance with a sidelink channel. For an implementation in which the wireless device 205 is a UE 115 and the wireless device 210 is a network entity 105, the transmission 215 may be performed in accordance with an uplink channel. In various implementations, the transmission 215 may be a unicast transmission, a multicast transmission, or a broadcast transmission, among other types of transmissions. In some implementations, the transmission 215 may be transmitted in accordance with a DFT-s-OFDM waveform, in which case the wireless device 205 may perform a modulation in accordance with DFT-s-OFDM techniques to support generation of the transmission 215. However, the described techniques may be implemented using other types of modulation schemes for the transmission 215.

The transmission 215 may be received by the wireless device 210 in accordance with various channel conditions, where a channel between the wireless device 205 and the wireless device may be associated with signal propagation conditions between the wireless device 205 and the wireless device 210 (such as signal propagation conditions subjected to the transmission 215). In some implementations, a signal received at a receiving device, y(t), may be given by the following:

$$y(t)=h*s(t)+n \qquad (1)$$

where h may represent the channel between the transmitting device and the receiving device, s(t) may represent the transmission by the transmitting device, and n may represent an addition of signal noise that may be superimposed on the transmitted signal as received at the receiving device. In some implementations, h may be a matrix or other transfer function representing how a signal may be modified along a propagation path between a transmitting device and a receiving device In some implementations, channel conditions (such as h in Equation 1) may be estimated by the wireless device 205, by the wireless device 210, or by both, which may support various signaling techniques by the wireless device 205 or the wireless device 210. For instance, the wireless device 205 may transmit one or more signals 220 (such as a pilot signal, a reference signal, a demodulation reference signal (DMRS), a synchronization signal block (SSB), a tracking reference signal (TRS), or a channel state estimation reference signal (CSI-RS)), and the wireless device 210 may measure the signals 220 to support the wireless device 210 estimating the channel conditions between the wireless device 205 and the wireless device 210. Using an estimate of the channel conditions between the wireless device 205 and the wireless device 210, the wireless device 210 may perform an equalization operation to cancel the estimated channel conditions from measurements of the transmission 215, which may improve a fidelity of receiving the transmission 215 relative to the transmission of the transmission 215 by the wireless device 205. Thus, by implementing various techniques for channel estimation and equalization, the wireless device 210 may improve a likelihood of successfully receiving the transmission 215.

Signal propagation conditions between the wireless device 205 and the wireless device 210 may be associated with different degrees of dispersion, which may be associated with energy of a transmitted signal arriving at a receiving device at different times (such as different times of arrival), or over a span of times, among other characteristics. For example, a transmitted signal may arrive at a receiving device by way of different signal propagation paths or via different signal reflections, which may be associated with different path lengths. In some implementations, different degrees of dispersion may be compensated for in an equalization operation, but may involve relatively higher or lower complexity depending on a degree of dispersion.

The signaling diagram 200 illustrates a time domain plot 240 and a frequency domain plot 250 that shows aspects of a dispersive channel (such as a dispersive channel h), which may be imposed on the transmission 215 as observed at the wireless device 210 in some scenarios (such as in accordance with the relationship of Equation 1). For instance, the time domain plot 240 may illustrate a channel h having time domain components h1(t)–hn(t), such as n 'clusters', illustrating a delay spread 245. The delay spread 245 illustrates how a transmission 215 may be received with different received powers at different times after the transmitting, which may be associated with symbol-to-symbol interference for a transmission 215, among other deterioration of signaling at the wireless device 210. The related frequency domain plot 250 shows the effect of the dispersive channel as a plot of power versus frequency, which shows a non-flat frequency response associated with the dispersive channel.

To support a time domain equalization in response to the dispersive channel, the wireless device 210 may implement a relatively high quantity of filter points (such as filter taps), which may involve relatively high processing complexity and power consumption to support the involved channel cancelation. For frequency domain equalization, which may be supported by DFT-s-OFDM waveforms and other signaling techniques that involve signals 220 such as a DMRS, the wireless device 210 may have a same or similar processing complexity and power consumption regardless of delay spread, which may involve a frequency domain filter, a time domain interpolation, a frequency domain interpolation, and a mean square error estimation, such as a linear minimum mean square error (LMMSE) equalization in accordance with the following:

$$\tilde{X}=H^H(HH^H+R_{nn})^{-1}y \tag{2}$$

where $\tilde{X}$ may be an equalized set of frequency domain data samples, H may be an estimated channel frequency response, $R_{nn}$ may be an estimated noise covariance matrix, and y may be frequency domain input symbols.

The signaling diagram 200 also illustrates a time domain plot 260 and a frequency domain plot 270 that shows aspects of a flat channel (such as a flat channel h), which may be imposed on the transmission 215 as observed at the wireless device 210 in some other scenarios. For instance, the time domain plot 260 may illustrate a channel h having a single time domain component h1(t), illustrating an absence of a delay spread. The related frequency domain plot 270 shows the effect of the flat channel as a plot of power versus frequency, as a flat frequency domain response associated with the channel. To support a time domain equalization in response to the flat channel, the wireless device 210 may implement a relatively low quantity of filter points, which may involve relatively low processing complexity and relatively low power consumption. In some implementations, to support a time domain equalization in response to the flat channel, the wireless device 210 may omit one or more aspects of a frequency domain interpolation, such as one or more Fourier transform operations, which may be associated with lower processor complexity or lower power consumption. Moreover, in some implementations, filtering of a time domain equalization may be performed without using measurements of signals 220.

In accordance with examples as disclosed herein, the wireless device 210 may be configured to support a selection between time domain equalization and frequency domain equalization for receiving signals associated with the transmission 215, which may be performed in accordance with detected channel conditions associated with a dispersive channel (such as conditions shown in the plot 240 and the plot 250) or a flat channel (such as conditions shown in the plot 260 and the plot 270), among other channel characteristics. For instance, if a relatively dispersive channel is detected, the wireless device 210 may select a frequency domain equalization to support relatively high signaling performance (such as increased fidelity for canceling aspects of the dispersive channel such as delay spread), which may be associated with lower power consumption than a time domain equalization for the relatively dispersive channel. If a relatively flat channel is detected, the wireless device 210 may select a time domain equalization to support relatively lower processing complexity, which may include changing a sampling rate into a symbol rate (such as using a resampler, such as a Farrow resampler) and omitting at least some operations associated with a frequency domain equalization. Thus, in some circumstances, performing a time domain equalization for a relatively flat channel may involve lower power consumption by the wireless device 210 for receiving the transmission 215 than a frequency domain equalization for the relatively flat channel. Therefore, techniques in accordance with examples as disclosed herein may support the wireless device 210 selecting an equalization scheme with relatively lower power consumption, which may improve efficiency of the wireless device 210, and may extend a duration of operation of the wireless device 210 for conditions in which the wireless device 210 is operating on a limited power supply.

Figure 3:
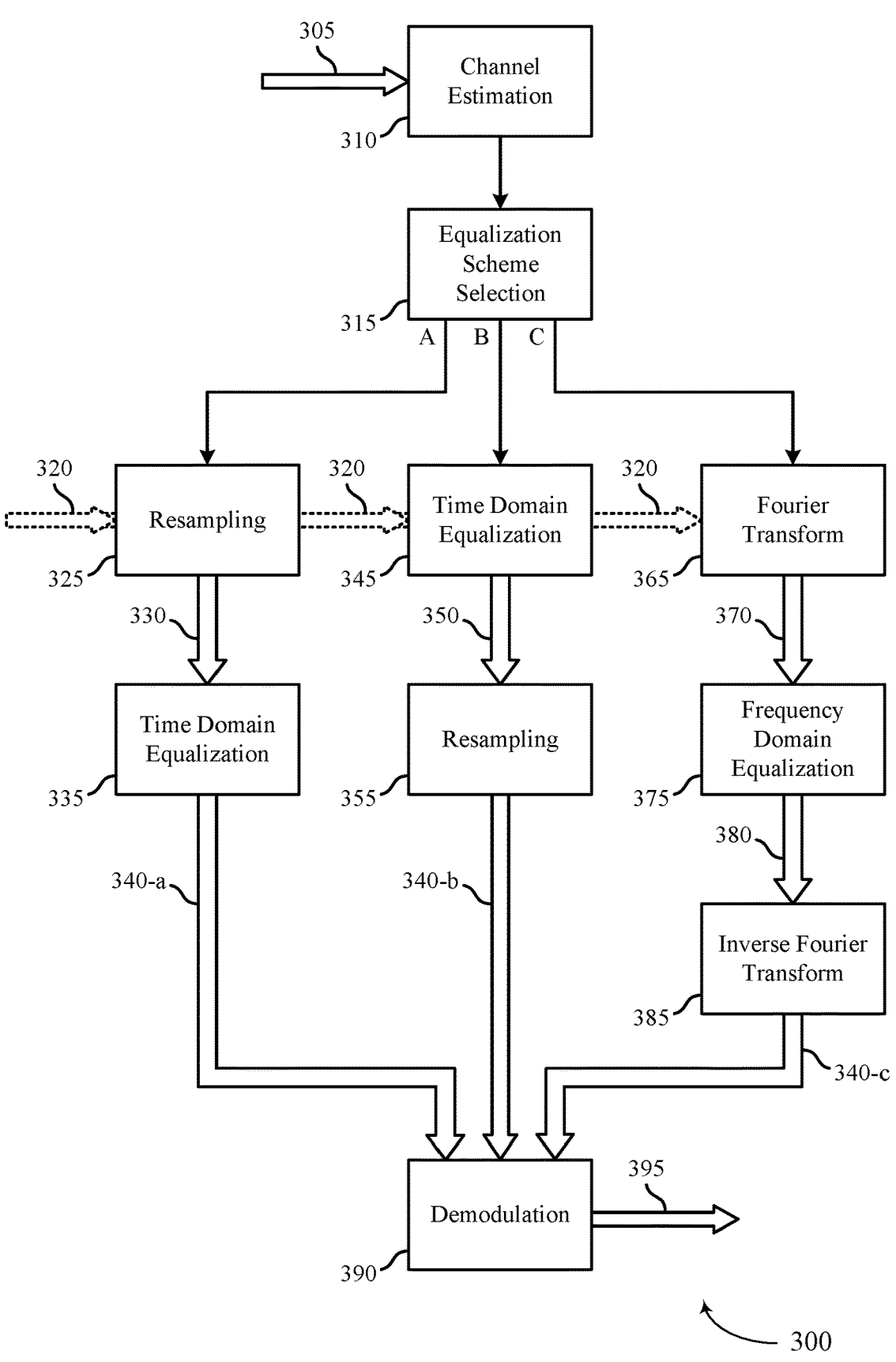
FIG. 3 shows an example of a process flow that supports equalization domain selection at a wireless device.

FIG. 3 shows an example of a process flow 300 that supports equalization domain selection at a wireless device. In some implementations, the operations of the process flow 300 may be performed by a wireless device 210 described with reference to FIG. 2 (such as a wireless device associated with performing a reception of a transmission 215).

At 310, the wireless device may perform one or more channel estimation operations. For instance, the wireless device may obtain an indication of a channel condition (such as a channel response) of a channel of a radio frequency spectrum band. In some implementations, the wireless device may obtain samples 305 (such as a set of pilot signal measurements, an input preamble, one or more samples of signals 220, a set of samples $\{p_1, p_2, \ldots, p_{N_{DMRS}}\}$ for which $N_{DMRS}$ may be associated with a quantity of DMRS or other pilot transmissions of a sampling interval), and obtain an indication of the channel condition using the samples 305. In some implementations, the samples 305 may be a sequence of measurements in the frequency domain, such as samples associated with one or more subcarriers, which may be transmitted in a same symbol duration. In some implementations, the samples 305 may be associated with measurement by the wireless device of a signaled preamble, a physical downlink shared channel (PDSCH) or physical downlink control channel (PDCCH) DMRS, an SSB, a TRS, a CSI-RS, among other signals or combinations of signals.

In some implementations, the channel estimation operations at 310 may include determining a delay spread of the channel. For instance, the delay spread may consider all the clusters of h (such as a cluster associated with each of h1(t), h2(t), and so on) to evaluate a 'center of mass' associated with a channel h(t). An example for calculating a delay spread, $\sigma_\tau$, is given as follows:

$$\sigma_\tau = \sqrt{\overline{\tau^2} - \overline{\tau}^2} \tag{3}$$

where values associated with $\tau$ may be given by:

$$\overline{\tau} = \frac{\sum_{i=0}^{K-1} |a_i|^2 \tau_i}{\sum_{i=0}^{K-1} |a_i|^2} \tag{4}$$

$$\overline{\tau^2} = \frac{\sum_{i=0}^{K-1} |a_i|^2 \tau_i^2}{\sum_{i=0}^{K-1} |a_i|^2}. \tag{5}$$

and where $\alpha_i$ is an amplitude of each cluster and $\tau$ is the delay.

At 315, the wireless device may perform one or more equalization scheme selection operations. For instance, the wireless device may select between a time domain equalization scheme and a frequency domain equalization scheme using an indication of the channel condition determined at 310, which may involve selecting an equalization scheme associated with a lowest power consumption.

In some implementations, selecting between a time domain equalization scheme and a frequency domain equal-ization scheme may be performed in accordance with a power associated with the time domain equalization scheme corresponding to the channel condition and a power associated with the frequency domain equalization scheme corresponding to the channel condition. For instance, a selection of 315 may include selecting a time domain equalization scheme if the power associated with the time domain equalization scheme corresponding to the channel condition is less than the power associated with the frequency domain equalization scheme corresponding to the channel condition, or selecting a frequency domain equalization scheme if the power associated with the frequency domain equalization scheme corresponding to the channel condition is less than the power associated with the time domain equalization scheme corresponding to the channel condition.

In some implementations, the wireless device may determine a power consumption for various portions of candidate equalization schemes. For example, a selection at 315 may involve determining a power consumed by a resampling operation (such as for a time domain equalization), such as a power consumption of a Farrow resampler or other resampler (such as a resampling filter), which may be obtained in a digital front end of the wireless device without additional power consumption. Additionally, or alternatively, a selection at 315 may involve determining a power consumed by the time domain equalizer itself, such as a filter or decision feedback error. In some implementations, a quantity of samples to equalize may depend on a size of the allocation, and not the size of the FFT, in which case a smaller allocation may consume less power. In some implementations, a power consumption associated with a time domain equalization operation may be based on measurements or on a quantity of filter taps involved with equalizing the channel, which may be approximated based on a quantity of points in an FFT and a quantity of filter taps (such as power proportional to $n_{FFT} * N_{filterTaps}$) Additionally, or alternatively, a selection at 315 may involve determining a power consumed by an FFT operation, a DFT operation, and the frequency domain equalization itself. For instance, power consumption of FFT and DFT operations may be based on measurements (such as of the samples 305) or on complexity analysis, which also may be approximated based on a quantity of points in an FFT and a quantity of filter taps (such as power proportional to $n_{FFT} * \log(n_{FFT})$). In some implementations, power consumption associated with the frequency domain equalization may be approximated based on a quantity of points in an FFT (such as power proportional to $n_{FFT}$). In accordance with these and other examples, the wireless device may compare the power consumed by each method and select the equalization scheme associated with the lowest power consumption.

In some implementations, selecting between a time domain equalization scheme and a frequency domain equalization scheme may be performed in accordance with a delay spread, such as a delay spread delay spread associated with the channel condition. For instance, the wireless device may obtain an estimate of the delay spread, and a selection of 315 may include selecting the time domain equalization scheme if the delay spread is below a threshold delay spread, or selecting a frequency domain equalization scheme if the delay spread is above the threshold delay spread. In some implementations, a threshold delay spread may be obtained from a lookup table (such as a lookup table that considers detected Doppler spread, noise conditions, or movement of the wireless device, or any combination thereof), among other criteria, or may be obtained by machine learning at the wireless device, among other techniques. In some implementations, obtaining a delay spread threshold (such as using a lookup table) may consider a peak-to-peak channel power of an allocation as follows:

$$P2P = \max(abs(\overline{H})) - \min(abs(\overline{H})) \qquad (6)$$

where $\overline{H}$ is the channel frequency response. Additionally, or alternatively, in some implementations, obtaining a delay spread threshold (such as using a lookup table) may consider a frequency variance of the channel as follows:

$$\mathrm{Var}(\overline{H}) = \Sigma abs(\overline{H}^2) - (\Sigma abs(\overline{H})) \qquad (7)$$

A selection between equalization schemes at 315 may be performed among one or more options of time domain equalization schemes and one or more options of frequency domain equalization schemes. For instance, the process flow 300 shows an example of two time domain equalization techniques, labeled as option 'A' (a first time domain equalization scheme) and option 'B' (a second time domain equalization scheme), which may differ at least in part on whether resampling is performed before or after time domain equalization, and one frequency equalization technique, labeled as option 'C'. In some implementations, if a channel is determined to be flat, the wireless device may select one of options A or B and, if a channel is determined to be non-flat, the wireless device may select option C. In some implementations, a wireless device may be configured to support both option A and option B, and a selection between option A and option B may be performed based on a channel condition determined at 305, among other criteria. In some other implementations, a wireless device may be configured to support either option A or option B, with the configured option performed in response to a selection of a time domain equalization scheme. Thus, in the context of the example of process flow 300, a selection at 315 may be performed among options A, B, and C, or between options A and C, or between options B and C. However, other implementations may involve a selection among different quantities of options for time domain equalization schemes and frequency domain equalization schemes.

To support a demodulation of a signal received over a channel of a radio frequency spectrum band, the wireless device may obtain samples 320 (such as a set of time domain data samples, samples of a transmission 215, a set of samples $\{x_1, x_2, \ldots, x_{NFFT}\}$ for which NFFT may be associated with a quantity of samples for the sampling interval that may be greater than a quantity of modulation symbols represented by the samples 320) in accordance with the channel. In some implementations, the samples 320 may be associated with (such as modulated in accordance with or otherwise output in accordance with) a DFT-s-OFDM modulation scheme. In various implementations, the samples 320 may be obtained from a downlink channel, or a sidelink channel, or an uplink channel. The process flow 300 shows an example for outputting a set of modulation symbols in accordance with the samples 320 using a time domain equalization scheme or a frequency domain equalization scheme at selected at 315.

In some circumstances, at 325, the wireless device may perform one or more resampling operations. For instance, in response to selecting a first time domain equalization scheme (such as selecting option A), the wireless device may, at 325, resample the samples 320 to obtain samples 330 (such as a resampled set of time domain data samples, a set of samples $\{x_1, x_2, \ldots, x_{N\_DFT}\}$ for which N_DFT may be equal to a quantity of modulation symbols represented by the samples 320). In some implementations, the resampling of 325 may be performed in accordance with an OFDM symbol rate. In some implementations, to resample the samples 320, the wireless device may input the samples 320 into a resampler, such as a resampling filter, to obtain the samples 330. In some implementations, to convert samples from one rate to another, such a resampler may involve one or more interpolation techniques, such as a linear interpolation, a polynomial interpolation, a logarithmic interpolation, among other techniques for interpolation or combination thereof. In some implementations, such resampling techniques may also implement one or more filters, such as an input filter, an output filter, or a combination thereof. In some implementations, a resampling technique may be selected or otherwise configured to support the operations of 325 with relatively low processing complexity, relatively low power consumption or both. In some implementations, to resample the samples 320, the wireless device may input the samples 320 into a Farrow resampler.

At 335, the wireless device may perform one or more time domain equalization operations. For instance, the wireless device may perform a time domain equalization scheme using the samples 330 to obtain samples 340-*a* (such as an equalized set of time domain samples, an equalized set of resampled time domain samples, a set of samples $\{\tilde{x}_1, \tilde{x}_2, \ldots, \tilde{x}_{N\_DFT}\}$). In some implementations, the time domain equalization of 345 may be performed in accordance with a channel estimation associated with the samples 305, such as the channel estimation performed of 310. For instance, the time domain equalization of 335 may be based on a filter calculated from the channel estimation of 310, which may be a relatively short filter based on the criteria for selecting option A. For circumstances in which option A is selected, the samples 340-*a* may be provided for the demodulation of 390. In some other implementations, one or more of the operations of 325, of 335, or of 390, or of any combination thereof may be incorporated deep neural network operation that may perform aspects of a demodulation or demodulation attempt.

In some circumstances, at 345, the wireless device may perform one or more time domain equalization operations. For instance, in response to selecting a second time domain equalization scheme (such as selecting option B), the wireless device may, at 345, perform a time domain equalization scheme using the samples 320 to obtain samples 350 (such as an equalized set of time domain samples, a set of samples $\{\tilde{x}_1, \tilde{x}_2, \ldots, \tilde{x}_{NFFT}\}$). In some implementations, the time domain equalization of 345 may be performed in accordance with a channel estimation associated with the samples 305, such as the channel estimation performed of 310. For instance, the time domain equalization of 345 may be based on a filter calculated from the channel estimation of 310, which may be a relatively short filter based on the criteria for selecting option B.

At 355, the wireless device may perform one or more resampling operations. For instance, the wireless device may resample the samples 350 to obtain samples 340-*b* (such as a resampled equalized set of time domain samples, a resampled set of equalized time domain samples, a set of samples $\{\tilde{x}_1, \tilde{x}_2, \ldots, \tilde{x}_{N\_DFT}\}$). In some implementations, the resampling of 355 may be performed in accordance with an OFDM symbol rate. In some implementations, to resample the samples 350, the wireless device may input the samples 350 into a resampler, such as a resampling filter, to obtain the samples 340-*b*. In some implementations, to convert samples from one rate to another, such a resampler may involve one or more interpolation techniques, such as a linear interpolation, a polynomial interpolation, a logarithmic interpolation, among other techniques for interpolation or combination thereof. In some implementations, such resampling techniques may also implement one or more filters, such as an input filter, an output filter, or a combination thereof. In some implementations, a resampling technique may be selected or otherwise configured to support the operations of 355 with relatively low processing complexity, relatively low power consumption or both. In some implementations, to resample the samples 320, the wireless device may input the samples 320 into a Farrow resampler. For circumstances in which option B is selected, the samples 340-*b* may be provided for the demodulation of 390.

In some circumstances, at 365, the wireless device may perform one or more Fourier transform operations (such as a FFT or DFT). For instance, in response to selecting a frequency domain equalization scheme (such as selecting option C), the wireless device may, at 365, perform a Fourier transform on the samples 320 to obtain samples 370 (such as a set of frequency domain data samples, a set of samples $\{X_1, X_2, \ldots, X_{NFFT}\}$ for which NFFT may be associated with a quantity of frequency domain samples for the sampling interval and may be a power of two).

At 375, the wireless device may perform one or more frequency domain equalization operations. For instance, the wireless device may perform a frequency domain equalization scheme using the samples 370 to obtain samples 380 (such as an equalized set of frequency domain data samples, a set of samples $\{\tilde{X}_1, \tilde{X}_2, \ldots, \tilde{X}_{N\_DFT}\}$, a set of samples $\{\tilde{X}_1, \tilde{X}_2, \ldots, \tilde{X}_{NFFT}\}$). In some implementations, the frequency domain equalization may be performed in accordance with Equation 2.

At 385, the wireless device may perform one or more inverse Fourier transform operations (such as an iDFT or iFFT). For instance, the wireless device may perform an inverse Fourier transform on the samples 380 to obtain samples 340-*c* (such as an equalized set of time domain data samples, a set of samples $\{\tilde{x}_1, \tilde{x}_2, \ldots, \tilde{x}_{N\_DFT}\}$ for which N_DFT may be associated with a size of the inverse Fourier transform such as quantity of frequency domain samples for the sampling interval, which may be smaller than NFFT). For circumstances in which option C is selected, the samples 340-*c* may be provided for the demodulation of 390.

At 390, the wireless device may perform one or more demodulation operations. For instance, the wireless device may demodulate samples 340 to obtain samples 395 (such as a set of modulation symbols, a set of constellation symbols, a set of bits, a bit stream, a set of samples a set of samples $\{\tilde{s}_1, \tilde{s}_2, \ldots, \tilde{s}_{N\_DFT}\}$) In some implementations, the wireless device may use the same demodulation operation to obtain the samples 395 from any of the samples 340-*a* (samples obtained in accordance with a first time domain equalization scheme), the samples 340-*b* (samples obtained in accordance with a second time domain equalization scheme), or the samples 340-*c* (samples obtained in accordance with a frequency domain equalization scheme). In some other implementations, the demodulation operations of 390 may be different depending on whether the wireless device obtained the samples 340-*a*, the samples 340-*b*, or the samples 340-*c*.

Thus, the process flow 300 shows an example for configuring a wireless device to support a selection between time domain equalization and frequency domain equalization for receiving signaling associated with samples 320, which may be performed in accordance with channel conditions detected at 310. For instance, if a relatively dispersive channel is detected, the wireless device may select a frequency domain equalization and, if a relatively flat channel is detected, the wireless device may select a time domain equalization. Such techniques may support the wireless device selecting an equalization scheme with relatively lower power consumption, which may improve efficiency of the wireless device, and may extend a duration of operation of the wireless device for conditions in which the wireless device is operating using a limited power supply.

Figure 4:
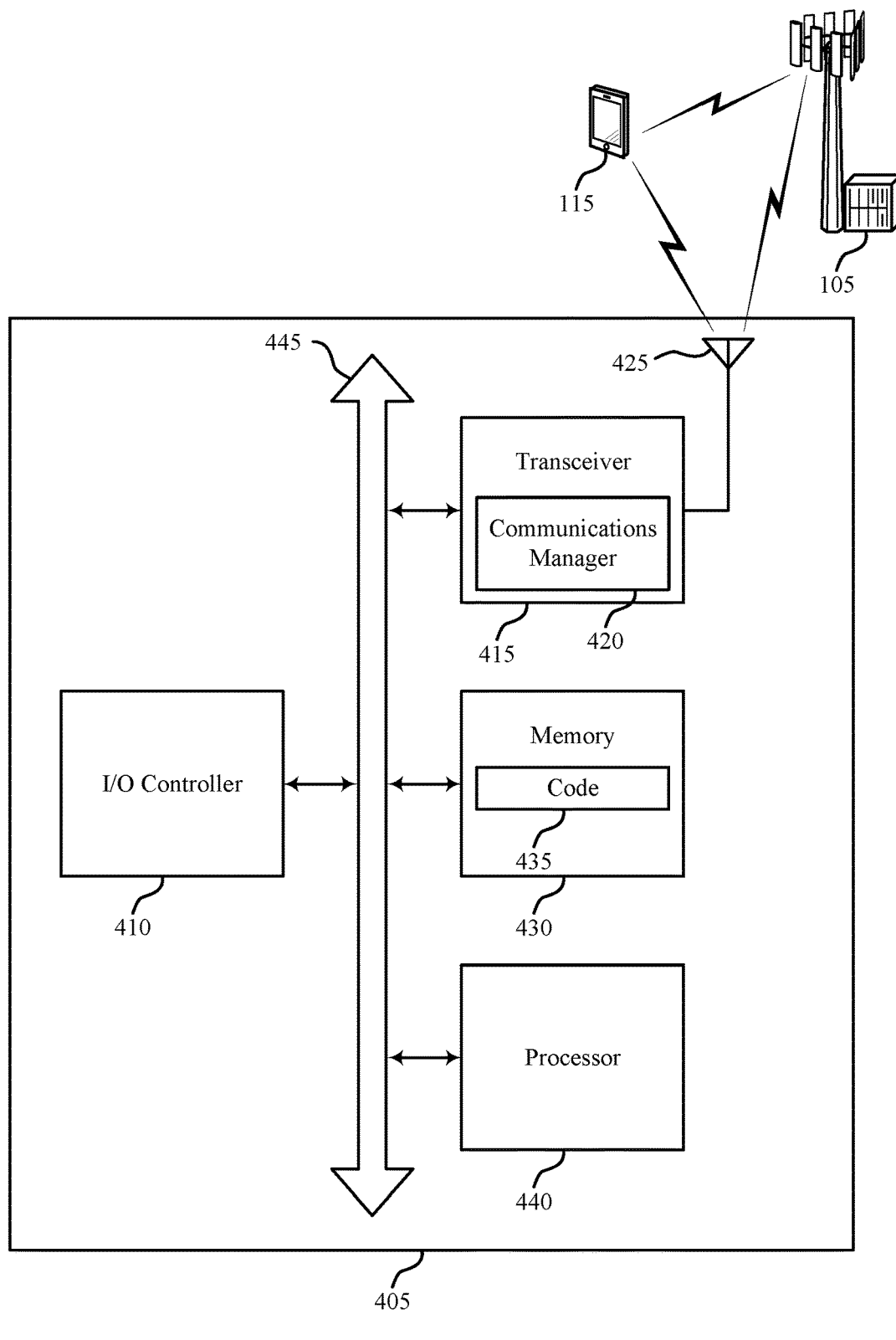
FIG. 4 shows a diagram of a system including a UE that supports equalization domain selection at a wireless device.

FIG. 4 shows a diagram of a system 400 including a device 405 that supports equalization domain selection at a wireless device. The device 405 may communicate (such as wirelessly) with one or more network entities (such as one or more components of one or more BSs 140), one or more UEs 115, or any combination thereof. The device 405 may include components for bi-directional voice and data communications including components for transmitting and receiving communications, such as a communications manager 420, an input/output (I/O) controller 410, a transceiver 415, an antenna 425, a memory 430, code 435, and a processor 440. These components may be in electronic communication or otherwise coupled (such as operatively, communicatively, functionally, electronically, electrically) via one or more buses (such as a bus 445).

The I/O controller 410 may manage input and output signals for the device 405. The I/O controller 410 also may manage peripherals not integrated into the device 405. In some implementations, the I/O controller 410 may represent a physical connection or port to an external peripheral. In some implementations, the I/O controller 410 may utilize an operating system such as iOS®, ANDROID®, MS-DOS®, MS-WINDOWS®, OS/2®, UNIX®, LINUX®, or another known operating system. Additionally, or alternatively, the I/O controller 410 may represent or interact with a modem, a keyboard, a mouse, a touchscreen, or a similar device. In some implementations, the I/O controller 410 may be implemented as part of a processor or processing system, such as the processor 440. In some implementations, a user may interact with the device 405 via the I/O controller 410 or via hardware components controlled by the I/O controller 410.

In some implementations, the device 405 may include a single antenna 425. However, in some other implementations, the device 405 may have more than one antenna 425, which may be capable of concurrently transmitting or receiving multiple wireless transmissions. The transceiver 415 may communicate bi-directionally, via the one or more antennas 425, wired, or wireless links as described herein. For example, the transceiver 415 may represent a wireless transceiver and may communicate bi-directionally with another wireless transceiver. The transceiver 415 also may include a modem to modulate the packets, to provide the modulated packets to one or more antennas 425 for transmission, and to demodulate packets received from the one or more antennas 425. In some implementations, the transceiver 415 may include one or more interfaces, such as one or more interfaces coupled with the one or more antennas 425 that are configured to support various receiving or obtaining operations, or one or more interfaces coupled with the one or more antennas 425 that are configured to support various transmitting or outputting operations, or a combination thereof. In some implementations, the transceiver 415 may include or be configured for coupling with one or more processors or memory components that are operable to perform or support operations based on received or obtained information or signals, or to generate information or other signals for transmission or other outputting, or any combination thereof. In some implementations, the transceiver 415, or the transceiver 415 and the one or more antennas 425, or the transceiver 415 and the one or more antennas 425 and one or more processors or memory components (such as the processor 440, or the memory 430, or both), may be included in a chip or chip assembly that is installed in the device 405.

The memory 430 may include random access memory (RAM) and read-only memory (ROM). The memory 430 may store computer-readable, computer-executable code 435 including instructions that, when executed by the processor 440, cause the device 405 to perform various functions described herein. The code 435 may be stored in a non-transitory computer-readable medium such as system memory or another type of memory. In some implementations, the code 435 may not be directly executable by the processor 440 but may cause a computer (such as when compiled and executed) to perform functions described herein. In some implementations, the memory 430 may contain, among other things, a basic I/O system (BIOS) which may control basic hardware or software operation such as the interaction with peripheral components or devices.

The processor 440 may include an intelligent hardware device (such as a general-purpose processor, a digital signal processor (DSP), an application-specific integrated circuit (ASIC), a central processing unit (CPU), a field-programmable gate array (FPGA), a microcontroller, a programmable logic device, discrete gate or transistor logic, a discrete hardware component, or any combination thereof). In some implementations, the processor 440 may be configured to operate a memory array using a memory controller. In some other implementations, a memory controller may be integrated into the processor 440. The processor 440 may be configured to execute computer-readable instructions stored in a memory (such as the memory 430) to cause the device 405 to perform various functions (such as functions or tasks supporting equalization domain selection at a wireless device). For example, the device 405 or a component of the device 405 may include a processor 440 and memory 430 coupled with the processor 440, the processor 440 and memory 430 configured to perform various functions described herein. The processor 440 may be an example of a cloud-computing platform (such as one or more physical nodes and supporting software such as operating systems, virtual machines, or container instances) that may host the functions (such as by executing code 435) to perform the functions of the device 405. The processor 440 may be any one or more suitable processors capable of executing scripts or instructions of one or more software programs stored in the device 405 (such as within the memory 430). In some implementations, the processor 440 may be a component of a processing system. A processing system may generally refer to a system or series of machines or components that receives inputs and processes the inputs to produce a set of outputs (which may be passed to other systems or components of, for example, the device 405). For example, a processing system of the device 405 may refer to a system including the various other components or subcomponents of the device 405, such as the processor 440, or the transceiver 415, or the communications manager 420, or other components or combinations of components of the device 405. The processing system of the device 405 may interface with other components of the device 405, and may process information received from other components (such as inputs or signals) or output information to other components. For example, a chip or modem of the device 405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 405 may transmit information output from the chip or modem. Additionally, or alternatively, in some implementations, the one or more interfaces may refer to an interface between the processing system of the chip or modem and a receiver, such that the device 405 may obtain information or signal inputs, and the information may be passed to the processing system. A person having ordinary skill in the art will readily recognize that a first interface also may obtain information or signal inputs, and a second interface also may output information or signal outputs.

The communications manager 420 may support wireless communication at a wireless device in accordance with examples as disclosed herein. For example, the communications manager 420 may be configured as or otherwise support a means for obtaining an indication of a channel condition of a channel of a radio frequency spectrum band, and selecting between a time domain equalization scheme and a frequency domain equalization scheme using the indication of the channel condition of the channel of the radio frequency spectrum band. In some implementations, the communications manager 420 may be configured as or otherwise support a means for obtaining a set of time domain data samples in accordance with the channel of the radio frequency spectrum band. In some implementations, the communications manager 420 may be configured as or otherwise support a means for outputting a set of modulation symbols in accordance with the set of time domain data samples using the selected time domain equalization scheme or frequency domain equalization scheme.

In some implementations, the communications manager 420 may be configured as or otherwise support a means for resampling the set of time domain data samples in accordance with an OFDM symbol rate to obtain a resampled set of time domain data samples in response to selecting the time domain equalization scheme. In some implementations, the communications manager 420 may be configured as or otherwise support a means for performing the time domain equalization scheme using the resampled set of time domain data samples to obtain an equalized set of time domain data samples.

In some implementations, to support resampling the set of time domain data samples, the communications manager 420 may be configured as or otherwise support a means for inputting the set of time domain data samples into a Farrow resampler.

In some implementations, the communications manager 420 may be configured as or otherwise support a means for demodulating the equalized set of time domain data samples to obtain the set of modulation symbols.

In some implementations, the communications manager 420 may be configured as or otherwise support a means for performing the time domain equalization scheme using the set of time domain data samples to obtain an equalized set of time domain data samples in response to selecting the time domain equalization scheme.

In some implementations, the communications manager 420 may be configured as or otherwise support a means for resampling the equalized set of time domain data samples in accordance with an OFDM symbol rate to obtain a resampled equalized set of time domain data samples. In some implementations, the communications manager 420 may be configured as or otherwise support a means for demodulating the resampled equalized set of time domain data samples to obtain the set of modulation symbols.

In some implementations, to support resampling the equalized set of time domain data samples, the communications manager 420 may be configured as or otherwise support a means for inputting the equalized set of time domain data samples into a Farrow resampler.

In some implementations, the communications manager 420 may be configured as or otherwise support a means for performing a Fourier transform on the set of time domain data samples to obtain a set of frequency domain data samples in response to selecting the frequency domain equalization scheme. In some implementations, the communications manager 420 may be configured as or otherwise support a means for performing the frequency domain equalization scheme using the set of frequency domain data samples to obtain an equalized set of frequency domain data samples.

In some implementations, the communications manager 420 may be configured as or otherwise support a means for performing an inverse Fourier transform on the equalized set of frequency domain data samples to obtain an equalized set of time domain data samples. In some implementations, the communications manager 420 may be configured as or otherwise support a means for demodulating the equalized set of time domain data samples to obtain the set of modulation symbols.

In some implementations, selecting between the time domain equalization scheme and the frequency domain equalization scheme may be in accordance with a power associated with the time domain equalization scheme corresponding to the channel condition and a power associated with the frequency domain equalization scheme corresponding to the channel condition. In some implementations, to support selecting between the time domain equalization scheme and the frequency domain equalization scheme, the communications manager 420 may be configured as or otherwise support a means for selecting the time domain equalization scheme if the power associated with the time domain equalization scheme corresponding to the channel condition is less than the power associated with the frequency domain equalization scheme corresponding to the channel condition. In some implementations, to support selecting between the time domain equalization scheme and the frequency domain equalization scheme, the communications manager 420 may be configured as or otherwise support a means for selecting the frequency domain equalization scheme if the power associated with the frequency domain equalization scheme corresponding to the channel condition is less than the power associated with the time domain equalization scheme corresponding to the channel condition.

In some implementations, selecting between the time domain equalization scheme and the frequency domain equalization scheme may be in accordance with a delay spread associated with the channel condition. In some implementations, to support selecting between the time domain equalization scheme and the frequency domain equalization scheme, the communications manager 420 may be configured as or otherwise support a means for selecting the time domain equalization scheme if the delay spread is below a threshold delay spread. In some implementations, to support selecting between the time domain equalization scheme and the frequency domain equalization scheme, the communications manager 420 may be configured as or otherwise support a means for selecting the frequency domain equalization scheme if the delay spread is above the threshold delay spread.

In some implementations, the communications manager 420 may be configured as or otherwise support a means for obtaining a set of pilot signal measurements. In some implementations, the communications manager 420 may be configured as or otherwise support a means for obtaining the indication of the channel condition using the set of pilot signal measurements.

In some implementations, the communications manager 420 may be configured as or otherwise support a means for performing the selected time domain equalization scheme or frequency domain equalization scheme in accordance with a channel estimation associated with the set of pilot signal measurements.

In some implementations, the set of time domain data samples may be associated with a DFT-s-OFDM modulation scheme.

In some implementations, to support obtaining the set of time domain data samples, the communications manager 420 may be configured as or otherwise support a means for obtaining the set of time domain data samples in accordance with a downlink channel of the radio frequency spectrum band or a sidelink channel of the radio frequency spectrum band.

In some implementations, the communications manager 420 may be configured to perform various operations (such as receiving, monitoring, transmitting) using or otherwise in cooperation with the transceiver 415, the one or more antennas 425, or any combination thereof. Although the communications manager 420 is illustrated as a component of the transceiver 415, in some implementations, one or more functions described with reference to the communications manager 420 may be supported by or performed by the transceiver 415, the processor 440, the memory 430, the code 435, or any combination thereof. For example, the code 435 may include instructions executable by the processor 440 to cause the device 405 to perform various aspects of equalization domain selection at a wireless device as described herein, or the processor 440 and the memory 430 may be otherwise configured to perform or support such operations.

Figure 5:
FIG. 5 shows a diagram of a system including a network entity that supports equalization domain selection at a wireless device.

FIG. 5 shows a diagram of a system 500 including a device 505 that supports equalization domain selection at a wireless device. The device 505 may communicate with one or more network entities (such as one or more components of one or more BSs 140), one or more UEs 115, or any combination thereof, which may include communications over one or more wired interfaces, over one or more wireless interfaces, or any combination thereof. The device 505 may include components that support outputting and obtaining communications, such as a communications manager 520, a transceiver 510, an antenna 515, a memory 525, code 530, and a processor 535. These components may be in electronic communication or otherwise coupled (such as operatively, communicatively, functionally, electronically, electrically) via one or more buses (such as a bus 540).

The transceiver 510 may support bi-directional communications via wired links, wireless links, or both as described herein. In some implementations, the transceiver 510 may include a wired transceiver and may communicate bi-directionally with another wired transceiver. Additionally, or alternatively, in some examples, the transceiver 510 may include a wireless transceiver and may communicate bi-directionally with another wireless transceiver. In some implementations, the device 505 may include one or more antennas 515, which may be capable of transmitting or receiving wireless transmissions (such as concurrently). The transceiver 510 also may include a modem to modulate signals, to provide the modulated signals for transmission (such as by one or more antennas 515, by a wired transmitter), to receive modulated signals (such as from one or more antennas 515, from a wired receiver), and to demodulate signals. In some implementations, the transceiver 510 may include one or more interfaces, such as one or more interfaces coupled with the one or more antennas 515 that are configured to support various receiving or obtaining operations, or one or more interfaces coupled with the one or more antennas 515 that are configured to support various transmitting or outputting operations, or a combination thereof. In some implementations, the transceiver 510 may include or be configured for coupling with one or more processors or memory components that are operable to perform or support operations based on received or obtained information or signals, or to generate information or other signals for transmission or other outputting, or any combination thereof. In some implementations, the transceiver 510, or the transceiver 510 and the one or more antennas 515, or the transceiver 510 and the one or more antennas 515 and one or more processors or memory components (such as the processor 535, or the memory 525, or both), may be included in a chip or chip assembly that is installed in the device 505. In some implementations, the transceiver may be operable to support communications via one or more communications links (such as a communication link 125, a backhaul communication link 120, a midhaul communication link 162, a fronthaul communication link 168).

The memory 525 may include RAM and ROM. The memory 525 may store computer-readable, computer-executable code 530 including instructions that, when executed by the processor 535, cause the device 505 to perform various functions described herein. The code 530 may be stored in a non-transitory computer-readable medium such as system memory or another type of memory. In some implementations, the code 530 may not be directly executable by the processor 535 but may cause a computer (such as when compiled and executed) to perform functions described herein. In some implementations, the memory 525 may contain, among other things, a BIOS which may control basic hardware or software operation such as the interaction with peripheral components or devices.

The processor 535 may include an intelligent hardware device (such as a general-purpose processor, a DSP, an ASIC, a CPU, an FPGA, a microcontroller, a programmable logic device, discrete gate or transistor logic, a discrete hardware component, or any combination thereof). In some implementations, the processor 535 may be configured to operate a memory array using a memory controller. In some other implementations, a memory controller may be integrated into the processor 535. The processor 535 may be configured to execute computer-readable instructions stored in a memory (such as the memory 525) to cause the device 505 to perform various functions (such as functions or tasks supporting equalization domain selection at a wireless device). For example, the device 505 or a component of the device 505 may include a processor 535 and memory 525 coupled with the processor 535, the processor 535 and memory 525 configured to perform various functions described herein. The processor 535 may be an example of a cloud-computing platform (such as one or more physical nodes and supporting software such as operating systems, virtual machines, or container instances) that may host the functions (such as by executing code 530) to perform the functions of the device 505. The processor 535 may be any one or more suitable processors capable of executing scripts or instructions of one or more software programs stored in the device 505 (such as within the memory 525). In some implementations, the processor 535 may be a component of a processing system. A processing system may generally refer to a system or series of machines or components that receives inputs and processes the inputs to produce a set of outputs (which may be passed to other systems or components of, for example, the device 505). For example, a processing system of the device 505 may refer to a system including the various other components or subcomponents of the device 505, such as the processor 535, or the transceiver 510, or the communications manager 520, or other components or combinations of components of the device 505. The processing system of the device 505 may interface with other components of the device 505, and may process information received from other components (such as inputs or signals) or output information to other components. For example, a chip or modem of the device 505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 505 may transmit information output from the chip or modem. Additionally, or alternatively, in some implementations, the one or more interfaces may refer to an interface between the processing system of the chip or modem and a receiver, such that the device 505 may obtain information or signal inputs, and the information may be passed to the processing system. A person having ordinary skill in the art will readily recognize that a first interface also may obtain information or signal inputs, and a second interface also may output information or signal outputs.

In some implementations, a bus 540 may support communications of (such as within) a protocol layer of a protocol stack. In some implementations, a bus 540 may support communications associated with a logical channel of a protocol stack (such as between protocol layers of a protocol stack), which may include communications performed within a component of the device 505, or between different components of the device 505 that may be co-located or located in different locations (such as where the device 505 may refer to a system in which one or more of the communications manager 520, the transceiver 510, the memory 525, the code 530, and the processor 535 may be located in one of the different components or divided between different components).

In some implementations, the communications manager 520 may manage aspects of communications with a core network 130 (such as via one or more wired or wireless backhaul links). For example, the communications manager 520 may manage the transfer of data communications for client devices, such as one or more UEs 115. In some implementations, the communications manager 520 may manage communications with other network entities 105, and may include a controller or scheduler for controlling communications with UEs 115 in cooperation with other network entities 105. In some implementations, the communications manager 520 may support an X2 interface within an LTE/LTE-A wireless communications network technology to provide communication between network entities 105.

The communications manager 520 may support wireless communication at a wireless device in accordance with examples as disclosed herein. For example, the communications manager 520 may be configured as or otherwise support a means for obtaining an indication of a channel condition of a channel of a radio frequency spectrum band, and selecting between a time domain equalization scheme and a frequency domain equalization scheme using the indication of the channel condition of the channel of the radio frequency spectrum band. In some implementations, the communications manager 520 may be configured as or otherwise support a means for obtaining a set of time domain data samples in accordance with the channel of the radio frequency spectrum band. In some implementations, the communications manager 520 may be configured as or otherwise support a means for outputting a set of modulation symbols in accordance with the set of time domain data samples using the selected time domain equalization scheme or frequency domain equalization scheme.

In some implementations, the communications manager 520 may be configured as or otherwise support a means for resampling the set of time domain data samples in accordance with an OFDM symbol rate to obtain a resampled set of time domain data samples in response to selecting the time domain equalization scheme. In some implementations, the communications manager 520 may be configured as or otherwise support a means for performing the time domain equalization scheme using the resampled set of time domain data samples to obtain an equalized set of time domain data samples.

In some implementations, to support resampling the set of time domain data samples, the communications manager 520 may be configured as or otherwise support a means for inputting the set of time domain data samples into a Farrow resampler.

In some implementations, the communications manager 520 may be configured as or otherwise support a means for demodulating the equalized set of time domain data samples to obtain the set of modulation symbols.

In some implementations, the communications manager 520 may be configured as or otherwise support a means for performing the time domain equalization scheme using the set of time domain data samples to obtain an equalized set of time domain data samples in response to selecting the time domain equalization scheme.

In some implementations, the communications manager 520 may be configured as or otherwise support a means for resampling the equalized set of time domain data samples in accordance with an OFDM symbol rate to obtain a resampled equalized set of time domain data samples. In some implementations, the communications manager 520 may be configured as or otherwise support a means for demodulating the resampled equalized set of time domain data samples to obtain the set of modulation symbols.

In some implementations, to support resampling the equalized set of time domain data samples, the communications manager 520 may be configured as or otherwise support a means for inputting the equalized set of time domain data samples into a Farrow resampler.

In some implementations, the communications manager 520 may be configured as or otherwise support a means for performing a Fourier transform on the set of time domain data samples to obtain a set of frequency domain data samples in response to selecting the frequency domain equalization scheme. In some implementations, the communications manager 520 may be configured as or otherwise support a means for performing the frequency domain equalization scheme using the set of frequency domain data samples to obtain an equalized set of frequency domain data samples.

In some implementations, the communications manager 520 may be configured as or otherwise support a means for performing an inverse Fourier transform on the equalized set of frequency domain data samples to obtain an equalized set of time domain data samples. In some implementations, the communications manager 520 may be configured as or otherwise support a means for demodulating the equalized set of time domain data samples to obtain the set of modulation symbols.

In some implementations, selecting between the time domain equalization scheme and the frequency domain equalization scheme may be in accordance with a power associated with the time domain equalization scheme corresponding to the channel condition and a power associated with the frequency domain equalization scheme corresponding to the channel condition. In some implementations, to support selecting between the time domain equalization scheme and the frequency domain equalization scheme, the communications manager 520 may be configured as or otherwise support a means for selecting the time domain equalization scheme if the power associated with the time domain equalization scheme corresponding to the channel condition is less than the power associated with the frequency domain equalization scheme corresponding to the channel condition. In some implementations, to support selecting between the time domain equalization scheme and the frequency domain equalization scheme, the communications manager 520 may be configured as or otherwise support a means for selecting the frequency domain equalization scheme if the power associated with the frequency domain equalization scheme corresponding to the channel condition is less than the power associated with the time domain equalization scheme corresponding to the channel condition.

In some implementations, selecting between the time domain equalization scheme and the frequency domain equalization scheme may be in accordance with a delay spread associated with the channel condition. In some implementations, to support selecting between the time domain equalization scheme and the frequency domain equalization scheme, the communications manager 520 may be configured as or otherwise support a means for selecting the time domain equalization scheme if the delay spread is below a threshold delay spread. In some implementations, to support selecting between the time domain equalization scheme and the frequency domain equalization scheme, the communications manager 520 may be configured as or otherwise support a means for selecting the frequency domain equalization scheme if the delay spread is above the threshold delay spread.

In some implementations, the communications manager 520 may be configured as or otherwise support a means for obtaining a set of pilot signal measurements. In some implementations, the communications manager 520 may be configured as or otherwise support a means for obtaining the indication of the channel condition using the set of pilot signal measurements.

In some implementations, the communications manager 520 may be configured as or otherwise support a means for performing the selected time domain equalization scheme or frequency domain equalization scheme in accordance with a channel estimation associated with the set of pilot signal measurements.

In some implementations, the set of time domain data samples is associated with a DFT-s-OFDM modulation scheme.

In some implementations, to support obtaining the set of time domain data samples, the communications manager 520 may be configured as or otherwise support a means for obtaining the set of time domain data samples in accordance with a downlink channel of the radio frequency spectrum band or a sidelink channel of the radio frequency spectrum band.

In some implementations, the communications manager 520 may be configured to perform various operations (such as receiving, obtaining, monitoring, outputting, transmitting) using or otherwise in cooperation with the transceiver 510, the one or more antennas 515 (where applicable), or any combination thereof. Although the communications manager 520 is illustrated as a separate component, in some implementations, one or more functions described with reference to the communications manager 520 may be supported by or performed by the processor 535, the memory 525, the code 530, the transceiver 510, or any combination thereof. For example, the code 530 may include instructions executable by the processor 535 to cause the device 505 to perform various aspects of equalization domain selection at a wireless device as described herein, or the processor 535 and the memory 525 may be otherwise configured to perform or support such operations.

FIG. 6 shows a flowchart illustrating a method 600 that supports equalization domain selection at a wireless device. The operations of the method 600 may be implemented by a UE or a network entity or its components as described herein. For example, the operations of the method 600 may be performed by a UE 115 or a network entity as described with reference to FIGS. 1-5. In some implementations, a UE or a network entity may execute a set of instructions to control the functional elements of the UE or the network entity to perform the described functions. Additionally, or alternatively, the UE or the network entity may perform aspects of the described functions using special-purpose hardware.

At 605, the method may include obtaining an indication of a channel condition of a channel of a radio frequency spectrum band. The operations of 605 may be performed in accordance with examples as disclosed herein.

At 610, the method may include selecting between a time domain equalization scheme and a frequency domain equalization scheme using the indication of the channel condition of the channel of the radio frequency spectrum band. The operations of 610 may be performed in accordance with examples as disclosed herein.

At 615, the method may include obtaining a set of time domain data samples in accordance with the channel of the radio frequency spectrum band. The operations of 615 may be performed in accordance with examples as disclosed herein.

At 620, the method may include outputting a set of modulation symbols in accordance with the set of time domain data samples using the selected time domain equalization scheme or frequency domain equalization scheme. The operations of 620 may be performed in accordance with examples as disclosed herein.

The following provides an overview of some aspects of the present disclosure:

Aspect 1: An apparatus for wireless communication, including: one or more interfaces configured to: obtain an indication of a channel condition of a channel of a radio frequency spectrum band; and a processing system configured to: select between a time domain equalization scheme and a frequency domain equalization scheme using the indication of the channel condition of the channel of the radio frequency spectrum band; the one or more interfaces configured to: obtain a set of time domain data samples in accordance with the channel of the radio frequency spectrum band; and output a set of modulation symbols in accordance with the set of time domain data samples using the selected time domain equalization scheme or frequency domain equalization scheme.

Aspect 2: The apparatus of aspect 1, where the processing system is further configured to: resample the set of time domain data samples in accordance with an OFDM symbol rate to obtain a resampled set of time domain data samples in response to selecting the time domain equalization scheme; and perform the time domain equalization scheme using the resampled set of time domain data samples to obtain an equalized set of time domain data samples.

Aspect 3: The apparatus of aspect 2, where, to resample the set of time domain data samples, the processing system is configured to input the set of time domain data samples into a Farrow resampler.

Aspect 4: The apparatus of any of aspects 2 through 3, where the processing system is further configured to demodulate the equalized set of time domain data samples to obtain the set of modulation symbols.

Aspect 5: The apparatus of any of aspects 1 through 4, where the processing system is further configured to perform the time domain equalization scheme using the set of time domain data samples to obtain an equalized set of time domain data samples in response to selecting the time domain equalization scheme.

Aspect 6: The apparatus of aspect 5, where the processing system is further configured to resample the equalized set of time domain data samples in accordance with an OFDM symbol rate to obtain a resampled equalized set of time domain data samples; and demodulate the resampled equalized set of time domain data samples to obtain the set of modulation symbols.

Aspect 7: The apparatus of aspect 6, where, to resample the equalized set of time domain data samples, the processing system is configured to input the equalized set of time domain data samples into a Farrow resampler.

Aspect 8: The apparatus of any of aspects 1 through 7, where the processing system is further configured to perform a Fourier transform on the set of time domain data samples to obtain a set of frequency domain data samples in response to selecting the frequency domain equalization scheme, and perform the frequency domain equalization scheme using the set of frequency domain data samples to obtain an equalized set of frequency domain data samples.

Aspect 9: The apparatus of aspect 8, where the processing system is further configured to perform an inverse Fourier transform on the equalized set of frequency domain data samples to obtain an equalized set of time domain data samples, and demodulate the equalized set of time domain data samples to obtain the set of modulation symbols.

Aspect 10: The apparatus of any of aspects 1 through 9, where the processing system is further configured to select between the time domain equalization scheme and the frequency domain equalization scheme in accordance with a power associated with the time domain equalization scheme corresponding to the channel condition and a power associated with the frequency domain equalization scheme corresponding to the channel condition.

Aspect 11: The apparatus of aspect 10, where, to select between the time domain equalization scheme and the frequency domain equalization scheme, the processing system is configured to select the time domain equalization scheme if the power associated with the time domain equalization scheme corresponding to the channel condition is less than the power associated with the frequency domain equalization scheme corresponding to the channel condition, or select the frequency domain equalization scheme if the power associated with the frequency domain equalization scheme corresponding to the channel condition is less than the power associated with the time domain equalization scheme corresponding to the channel condition.

Aspect 12: The apparatus of any of aspects 1 through 11, where the processing system is further configured to select between the time domain equalization scheme and the frequency domain equalization scheme in accordance with a delay spread associated with the channel condition.

Aspect 13: The apparatus of aspect 12, where, to select between the time domain equalization scheme and the frequency domain equalization scheme, the processing system is configured to select the time domain equalization scheme if the delay spread is below a threshold delay spread, or select the frequency domain equalization scheme if the delay spread is above the threshold delay spread.

Aspect 14: The apparatus of any of aspects 1 through 13, where the one or more interfaces are further configured to obtain a set of pilot signal measurements, and the processing system is further configured to obtain the indication of the channel condition using the set of pilot signal measurements.

Aspect 15: The apparatus of aspect 14, where the processing system is further configured to perform the selected time domain equalization scheme or frequency domain equalization scheme in accordance with a channel estimation associated with the set of pilot signal measurements.

Aspect 16: The apparatus of any of aspects 1 through 15, where the set of time domain data samples is associated with a DFT-s-OFDM modulation scheme.

Aspect 17: The apparatus of any of aspects 1 through 16, where obtaining the set of time domain data samples is performed at a UE.

Aspect 18: The apparatus of any of aspects 1 through 17, where, to obtain the set of time domain data samples, the one or more interfaces are configured to obtain the set of time domain data samples in accordance with a downlink channel of the radio frequency spectrum band or a sidelink channel of the radio frequency spectrum band.

Aspect 19: The apparatus of any of aspects 1 through 18 included in a UE.

Aspect 20: A method for wireless communication at a wireless device, including: obtaining an indication of a channel condition of a channel of a radio frequency spectrum band; selecting between a time domain equalization scheme and a frequency domain equalization scheme using the indication of the channel condition of the channel of the radio frequency spectrum band; obtaining a set of time domain data samples in accordance with the channel of the radio frequency spectrum band; and outputting a set of modulation symbols in accordance with the set of time domain data samples using the selected time domain equalization scheme or frequency domain equalization scheme.

Aspect 21: The method of aspect 20, further including: resampling the set of time domain data samples in accordance with an OFDM symbol rate to obtain a resampled set of time domain data samples in response to selecting the time domain equalization scheme; and performing the time domain equalization scheme using the resampled set of time domain data samples to obtain an equalized set of time domain data samples.

Aspect 22: The method of aspect 21, where resampling the set of time domain data samples includes: inputting the set of time domain data samples into a Farrow resampler.

Aspect 23: The method of any of aspects 21 through 22, further including: demodulating the equalized set of time domain data samples to obtain the set of modulation symbols.

Aspect 24: The method of any of aspects 20 through 23, further including: performing the time domain equalization scheme using the set of time domain data samples to obtain an equalized set of time domain data samples in response to selecting the time domain equalization scheme.

Aspect 25: The method of aspect 24, further including: resampling the equalized set of time domain data samples in accordance with an OFDM symbol rate to obtain a resampled equalized set of time domain data samples; and demodulating the resampled equalized set of time domain data samples to obtain the set of modulation symbols.

Aspect 26: The method of aspect 25, where resampling the equalized set of time domain data samples includes: inputting the equalized set of time domain data samples into a Farrow resampler.

Aspect 27: The method of any of aspects 20 through 26, further including: performing a Fourier transform on the set of time domain data samples to obtain a set of frequency domain data samples in response to selecting the frequency domain equalization scheme; and performing the frequency domain equalization scheme using the set of frequency domain data samples to obtain an equalized set of frequency domain data samples.

Aspect 28: The method of aspect 27, further including: performing an inverse Fourier transform on the equalized set of frequency domain data samples to obtain an equalized set of time domain data samples; and demodulating the equalized set of time domain data samples to obtain the set of modulation symbols.

Aspect 29: The method of any of aspects 20 through 28, where selecting between the time domain equalization scheme and the frequency domain equalization scheme is in accordance with a power associated with the time domain equalization scheme corresponding to the channel condition and a power associated with the frequency domain equalization scheme corresponding to the channel condition.

Aspect 30: The method of aspect 29, where selecting between the time domain equalization scheme and the frequency domain equalization scheme includes: selecting the time domain equalization scheme if the power associated with the time domain equalization scheme corresponding to the channel condition is less than the power associated with the frequency domain equalization scheme corresponding to the channel condition; or selecting the frequency domain equalization scheme if the power associated with the frequency domain equalization scheme corresponding to the channel condition is less than the power associated with the time domain equalization scheme corresponding to the channel condition.

Aspect 31: The method of any of aspects 20 through 30, where selecting between the time domain equalization scheme and the frequency domain equalization scheme is in accordance with a delay spread associated with the channel condition.

Aspect 32: The method of aspect 31, where selecting between the time domain equalization scheme and the frequency domain equalization scheme includes: selecting the time domain equalization scheme if the delay spread is below a threshold delay spread; or selecting the frequency domain equalization scheme if the delay spread is above the threshold delay spread.

Aspect 33: The method of any of aspects 20 through 32, further including: obtaining a set of pilot signal measurements; and obtaining the indication of the channel condition using the set of pilot signal measurements.

Aspect 34: The method of aspect 33, further including: performing the selected time domain equalization scheme or frequency domain equalization scheme in accordance with a channel estimation associated with the set of pilot signal measurements.

Aspect 35: The method of any of aspects 20 through 34, where the set of time domain data samples is associated with a DFT-s-OFDM modulation scheme.

Aspect 36: The method of any of aspects 20 through 35, where obtaining the set of time domain data samples is performed at a UE.

Aspect 37: The method of any of aspects 20 through 36, where obtaining the set of time domain data samples includes: obtaining the set of time domain data samples in accordance with a downlink channel of the radio frequency spectrum band or a sidelink channel of the radio frequency spectrum band.

Aspect 38: An apparatus for wireless communication at a wireless device, including: means for obtaining an indication of a channel condition of a channel of a radio frequency spectrum band; means for selecting between a time domain equalization scheme and a frequency domain equalization scheme using the indication of the channel condition of the channel of the radio frequency spectrum band; means for obtaining a set of time domain data samples in accordance with the channel of the radio frequency spectrum band; and means for outputting a set of modulation symbols in accordance with the set of time domain data samples using the selected time domain equalization scheme or frequency domain equalization scheme.

Aspect 39: The apparatus of aspect 38, further including: means for resampling the set of time domain data samples in accordance with an OFDM symbol rate to obtain a resampled set of time domain data samples in response to selecting the time domain equalization scheme; and means for performing the time domain equalization scheme using the resampled set of time domain data samples to obtain an equalized set of time domain data samples.

Aspect 40: The apparatus of aspect 39, where the means for resampling the set of time domain data samples include: means for inputting the set of time domain data samples into a Farrow resampler.

Aspect 41: The apparatus of any of aspects 39 through 40, further including: means for demodulating the equalized set of time domain data samples to obtain the set of modulation symbols.

Aspect 42: The apparatus of any of aspects 38 through 41, further including: means for performing the time domain equalization scheme using the set of time domain data samples to obtain an equalized set of time domain data samples in response to selecting the time domain equalization scheme.

Aspect 43: The apparatus of aspect 42, further including: means for resampling the equalized set of time domain data samples in accordance with an OFDM symbol rate to obtain a resampled equalized set of time domain data samples; and means for demodulating the resampled equalized set of time domain data samples to obtain the set of modulation symbols.

Aspect 44: The apparatus of aspect 43, where the means for resampling the equalized set of time domain data samples include: means for inputting the equalized set of time domain data samples into a Farrow resampler.

Aspect 45: The apparatus of any of aspects 38 through 44, further including: means for performing a Fourier transform on the set of time domain data samples to obtain a set of frequency domain data samples in response to selecting the frequency domain equalization scheme; and means for performing the frequency domain equalization scheme using the set of frequency domain data samples to obtain an equalized set of frequency domain data samples.

Aspect 46: The apparatus of aspect 45, further including: means for performing an inverse Fourier transform on the equalized set of frequency domain data samples to obtain an equalized set of time domain data samples; and means for demodulating the equalized set of time domain data samples to obtain the set of modulation symbols.

Aspect 47: The apparatus of any of aspects 38 through 46, where selecting between the time domain equalization scheme and the frequency domain equalization scheme is in accordance with a power associated with the time domain equalization scheme corresponding to the channel condition and a power associated with the frequency domain equalization scheme corresponding to the channel condition.

Aspect 48: The apparatus of aspect 47, where the means for selecting between the time domain equalization scheme and the frequency domain equalization scheme include: means for selecting the time domain equalization scheme if the power associated with the time domain equalization scheme corresponding to the channel condition is less than the power associated with the frequency domain equalization scheme corresponding to the channel condition; or means for selecting the frequency domain equalization scheme if the power associated with the frequency domain equalization scheme corresponding to the channel condition is less than the power associated with the time domain equalization scheme corresponding to the channel condition.

Aspect 49: The apparatus of any of aspects 38 through 48, where selecting between the time domain equalization scheme and the frequency domain equalization scheme is in accordance with a delay spread associated with the channel condition.

Aspect 50: The apparatus of aspect 49, where the means for selecting between the time domain equalization scheme and the frequency domain equalization scheme include: means for selecting the time domain equalization scheme if the delay spread is below a threshold delay spread; or means for selecting the frequency domain equalization scheme if the delay spread is above the threshold delay spread.

Aspect 51: The apparatus of any of aspects 38 through 50, further including: means for obtaining a set of pilot signal measurements; and means for obtaining the indication of the channel condition using the set of pilot signal measurements.

Aspect 52: The apparatus of aspect 51, further including: means for performing the selected time domain equalization scheme or frequency domain equalization scheme in accordance with a channel estimation associated with the set of pilot signal measurements.

Aspect 53: The apparatus of any of aspects 38 through 52, where the set of time domain data samples is associated with a DFT-s-OFDM modulation scheme.

Aspect 54: The apparatus of any of aspects 38 through 53, where obtaining the set of time domain data samples is performed at a UE.

Aspect 55: The apparatus of any of aspects 38 through 54, where the means for obtaining the set of time domain data samples include: means for obtaining the set of time domain data samples in accordance with a downlink channel of the radio frequency spectrum band or a sidelink channel of the radio frequency spectrum band.

Aspect 56: A non-transitory computer-readable medium storing code for wireless communication at a wireless device, the code including instructions executable by a processor to: obtain an indication of a channel condition of a channel of a radio frequency spectrum band; select between a time domain equalization scheme and a frequency domain equalization scheme using the indication of the channel condition of the channel of the radio frequency spectrum band; obtain a set of time domain data samples in accordance with the channel of the radio frequency spectrum band; and output a set of modulation symbols in accordance with the set of time domain data samples using the selected time domain equalization scheme or frequency domain equalization scheme.

Aspect 57: The non-transitory computer-readable medium of aspect 56, where the instructions are further executable by the processor to: resample the set of time domain data samples in accordance with an OFDM symbol rate to obtain a resampled set of time domain data samples in response to selecting the time domain equalization scheme; and perform the time domain equalization scheme using the resampled set of time domain data samples to obtain an equalized set of time domain data samples.

Aspect 58: The non-transitory computer-readable medium of aspect 57, where the instructions to resample the set of time domain data samples are executable by the processor to: input the set of time domain data samples into a Farrow resampler.

Aspect 59: The non-transitory computer-readable medium of any of aspects 57 through 58, where the instructions are further executable by the processor to: demodulate the equalized set of time domain data samples to obtain the set of modulation symbols.

Aspect 60: The non-transitory computer-readable medium of any of aspects 56 through 59, where the instructions are further executable by the processor to: perform the time domain equalization scheme using the set of time domain data samples to obtain an equalized set of time domain data samples in response to selecting the time domain equalization scheme.

Aspect 61: The non-transitory computer-readable medium of aspect 60, where the instructions are further executable by the processor to: resample the equalized set of time domain data samples in accordance with an OFDM symbol rate to obtain a resampled equalized set of time domain data samples; and demodulate the resampled equalized set of time domain data samples to obtain the set of modulation symbols.

Aspect 62: The non-transitory computer-readable medium of aspect 61, where the instructions to resample the equalized set of time domain data samples are executable by the processor to: input the equalized set of time domain data samples into a Farrow resampler.

Aspect 63: The non-transitory computer-readable medium of any of aspects 56 through 62, where the instructions are further executable by the processor to: perform a Fourier transform on the set of time domain data samples to obtain a set of frequency domain data samples in response to selecting the frequency domain equalization scheme; and perform the frequency domain equalization scheme using the set of frequency domain data samples to obtain an equalized set of frequency domain data samples.

Aspect 64: The non-transitory computer-readable medium of aspect 63, where the instructions are further executable by the processor to: perform an inverse Fourier transform on the equalized set of frequency domain data samples to obtain an equalized set of time domain data samples; and demodulate the equalized set of time domain data samples to obtain the set of modulation symbols.

Aspect 65: The non-transitory computer-readable medium of any of aspects 56 through 64, where selecting between the time domain equalization scheme and the frequency domain equalization scheme is in accordance with a power associated with the time domain equalization scheme corresponding to the channel condition and a power associated with the frequency domain equalization scheme corresponding to the channel condition.

Aspect 66: The non-transitory computer-readable medium of aspect 65, where the instructions to select between the time domain equalization scheme and the frequency domain equalization scheme are executable by the processor to: select the time domain equalization scheme if the power associated with the time domain equalization scheme corresponding to the channel condition is less than the power associated with the frequency domain equalization scheme corresponding to the channel condition; or select the frequency domain equalization scheme if the power associated with the frequency domain equalization scheme corresponding to the channel condition is less than the power associated with the time domain equalization scheme corresponding to the channel condition.

Aspect 67: The non-transitory computer-readable medium of any of aspects 56 through 66, where selecting between the time domain equalization scheme and the frequency domain equalization scheme is in accordance with a delay spread associated with the channel condition.

Aspect 68: The non-transitory computer-readable medium of aspect 67, where the instructions to select between the time domain equalization scheme and the frequency domain equalization scheme are executable by the processor to: select the time domain equalization scheme if the delay spread is below a threshold delay spread; or select the frequency domain equalization scheme if the delay spread is above the threshold delay spread.

Aspect 69: The non-transitory computer-readable medium of any of aspects 56 through 68, where the instructions are further executable by the processor to: obtain a set of pilot signal measurements; and obtain the indication of the channel condition using the set of pilot signal measurements.

Aspect 70: The non-transitory computer-readable medium of aspect 69, where the instructions are further executable by the processor to: perform the selected time domain equalization scheme or frequency domain equalization scheme in accordance with a channel estimation associated with the set of pilot signal measurements.

Aspect 71: The non-transitory computer-readable medium of any of aspects 56 through 70, where the set of time domain data samples is associated with a DFT-s-OFDM modulation scheme.

Aspect 72: The non-transitory computer-readable medium of any of aspects 56 through 71, where obtaining the set of time domain data samples is performed at a UE.

Aspect 73: The non-transitory computer-readable medium of any of aspects 56 through 72, where the instructions to obtain the set of time domain data samples are executable by the processor to: obtain the set of time domain data samples in accordance with a downlink channel of the radio frequency spectrum band or a sidelink channel of the radio frequency spectrum band.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A wireless communication device, comprising:
one or more memories; and
one or more processors operatively coupled to the one or more memories, the one or more processors configured to:
  obtain an indication of a channel condition of a channel of a radio frequency spectrum band, the channel condition including a flat channel condition or a dispersive channel condition; and
  select between a time domain equalization scheme and a frequency domain equalization scheme using the indication of the channel condition of the channel of the radio frequency spectrum band, wherein the selection comprises selecting the time domain equalization scheme if the channel condition includes the flat channel condition or the frequency domain equalization scheme if the channel condition includes the dispersive channel condition;
  obtain a set of time domain data samples in accordance with the channel of the radio frequency spectrum band; and
  output a set of modulation symbols in accordance with the set of time domain data samples using the selected time domain equalization scheme or frequency domain equalization scheme.

2. The wireless communication device of claim 1, wherein the one or more processors are further configured to:
  resample the set of time domain data samples in accordance with an orthogonal frequency-division multiplexing (OFDM) symbol rate to obtain a resampled set of time domain data samples in response to selecting the time domain equalization scheme; and
  perform the time domain equalization scheme using the resampled set of time domain data samples to obtain an equalized set of time domain data samples.

3. The wireless communication device of claim 2, wherein, the one or more processors, when configured to resample the set of time domain data samples, are configured to:
  input the set of time domain data samples into a Farrow resampler.

4. The wireless communication device of claim 2, wherein the one or more processors are further configured to:
  demodulate the equalized set of time domain data samples to obtain the set of modulation symbols.

5. The wireless communication device of claim 1, wherein the one or more processors are further configured to:
  perform the time domain equalization scheme using the set of time domain data samples to obtain an equalized set of time domain data samples in response to selecting the time domain equalization scheme.

6. The wireless communication device of claim 5, wherein the one or more processors are further configured to:
  resample the equalized set of time domain data samples in accordance with an orthogonal frequency-division multiplexing (OFDM) symbol rate to obtain a resampled equalized set of time domain data samples; and
  demodulate the resampled equalized set of time domain data samples to obtain the set of modulation symbols.

7. The wireless communication device of claim 6, wherein the one or more processors, when configured to resample the equalized set of time domain data samples, are configured to:
  input the equalized set of time domain data samples into a Farrow resampler.

8. The wireless communication device of claim 1, wherein the one or more processors are further configured to:
  perform a Fourier transform on the set of time domain data samples to obtain a set of frequency domain data samples in response to selecting the frequency domain equalization scheme; and
  perform the frequency domain equalization scheme using the set of frequency domain data samples to obtain an equalized set of frequency domain data samples.

9. The wireless communication device of claim 8, wherein the one or more processors are further configured to:
  perform an inverse Fourier transform on the equalized set of frequency domain data samples to obtain an equalized set of time domain data samples; and
  demodulate the equalized set of time domain data samples to obtain the set of modulation symbols.

10. The wireless communication device of claim 1, wherein the one or more processors are further configured to:
  select between the time domain equalization scheme and the frequency domain equalization scheme in accordance with a power associated with the time domain equalization scheme corresponding to the channel condition and a power associated with the frequency domain equalization scheme corresponding to the channel condition.

11. The wireless communication device of claim 10, wherein the one or more processors, when configured to select between the time domain equalization scheme and the frequency domain equalization scheme, are configured to:
  select the time domain equalization scheme if the power associated with the time domain equalization scheme corresponding to the flat channel condition is less than the power associated with the frequency domain equalization scheme corresponding to the flat channel condition; or
  select the frequency domain equalization scheme if the power associated with the frequency domain equalization scheme corresponding to the dispersive channel condition is less than the power associated with the time domain equalization scheme corresponding to the dispersive channel condition.

12. The wireless communication device of claim 1, wherein the one or more processors are further configured to:
  select between the time domain equalization scheme and the frequency domain equalization scheme in accordance with a delay spread associated with the channel condition.

13. The wireless communication device of claim 1, wherein the one or more processors are further configured to:
  obtain a set of pilot signal measurements; and
  obtain the indication of the channel condition using the set of pilot signal measurements.

14. The wireless communication device of claim 13, wherein the one or more processors are further configured to:

perform the selected time domain equalization scheme or frequency domain equalization scheme in accordance with a channel estimation associated with the set of pilot signal measurements.

15. The wireless communication device of claim 1, wherein the set of time domain data samples is associated with a discrete Fourier transform spread orthogonal frequency-division multiplexing (DFT-s-OFDM) modulation scheme.

16. The wireless communication device of claim 1, wherein the wireless communication device comprises a user equipment (UE).

17. The wireless communication device of claim 1, wherein the one or more processors, when configured to obtain the set of time domain data samples, are configured to:

obtain the set of time domain data samples in accordance with a downlink channel of the radio frequency spectrum band or a sidelink channel of the radio frequency spectrum band.

18. A method for wireless communication at a wireless device, comprising:

obtaining an indication of a channel condition of a channel of a radio frequency spectrum band, the channel condition including a flat channel condition or a dispersive channel condition;

selecting between a time domain equalization scheme and a frequency domain equalization scheme using the indication of the channel condition of the channel of the radio frequency spectrum band, wherein the selection comprises selecting the time domain equalization scheme if the channel condition includes the flat channel condition or the frequency domain equalization scheme if the channel condition includes the dispersive channel condition;

obtaining a set of time domain data samples in accordance with the channel of the radio frequency spectrum band; and outputting a set of modulation symbols in accordance with the set of time domain data samples using the selected time domain equalization scheme or frequency domain equalization scheme.

19. The method of claim 18, further comprising:

resampling the set of time domain data samples in accordance with an orthogonal frequency-division multiplexing (OFDM) symbol rate to obtain a resampled set of time domain data samples in response to selecting the time domain equalization scheme; and performing the time domain equalization scheme using the resampled set of time domain data samples to obtain an equalized set of time domain data samples.

20. The method of claim 18, further comprising:

performing the time domain equalization scheme using the set of time domain data samples to obtain an equalized set of time domain data samples in response to selecting the time domain equalization scheme.

21. The method of claim 18, further comprising:

performing a Fourier transform on the set of time domain data samples to obtain a set of frequency domain data samples in response to selecting the frequency domain equalization scheme; and performing the frequency domain equalization scheme using the set of frequency domain data samples to obtain an equalized set of frequency domain data samples.

22. The method of claim 18, wherein selecting between the time domain equalization scheme and the frequency domain equalization scheme is in accordance with a power associated with the time domain equalization scheme corresponding to the channel condition and a power associated with the frequency domain equalization scheme corresponding to the channel condition.

23. The method of claim 22, wherein the selection comprises:

selecting the time domain equalization scheme if the power associated with the time domain equalization scheme corresponding to the flat channel condition is less than the power associated with the frequency domain equalization scheme corresponding to the flat channel condition; or selecting the frequency domain equalization scheme if the power associated with the frequency domain equalization scheme corresponding to the dispersive channel condition is less than the power associated with the time domain equalization scheme corresponding to the dispersive channel condition.

24. The method of claim 18, wherein selecting between the time domain equalization scheme and the frequency domain equalization scheme is in accordance with a delay spread associated with the channel condition.

25. The method of claim 18, wherein the set of time domain data samples is associated with a discrete Fourier transform spread orthogonal frequency-division multiplexing (DFT-s-OFDM) modulation scheme.

26. A wireless communication device, comprising:

means for obtaining an indication of a channel condition of a channel of a radio frequency spectrum band, the channel condition including a flat channel condition or a dispersive channel condition;

means for selecting between a time domain equalization scheme and a frequency domain equalization scheme using the indication of the channel condition of the channel of the radio frequency spectrum band, wherein the selection comprises selecting the time domain equalization scheme if the channel condition includes the flat channel condition or the frequency domain equalization scheme if the channel condition includes the dispersive channel condition;

means for obtaining a set of time domain data samples in accordance with the channel of the radio frequency spectrum band; and means for outputting a set of modulation symbols in accordance with the set of time domain data samples using the selected time domain equalization scheme or frequency domain equalization scheme.

27. A non-transitory computer-readable medium storing code for wireless communication at a wireless communication device, the code comprising instructions executable by a processor to:

obtain an indication of a channel condition of a channel of a radio frequency spectrum band, the channel condition including a flat channel condition or a dispersive channel condition;

select between a time domain equalization scheme and a frequency domain equalization scheme using the indication of the channel condition of the channel of the radio frequency spectrum band, wherein the selection comprises selecting the time domain equalization scheme if the channel condition includes the flat channel condition or the frequency domain equalization scheme if the channel condition includes the dispersive channel condition;

obtain a set of time domain data samples in accordance with the channel of the radio frequency spectrum band; and output a set of modulation symbols in accordance with the set of time domain data samples using the selected time domain equalization scheme or frequency domain equalization scheme.

\* \* \* \* \*